US012687896B1

(12) United States Patent
Morrison et al.

(10) Patent No.: US 12,687,896 B1
(45) Date of Patent: Jul. 21, 2026

(54) PORTABLE INFORMATION HANDLING SYSTEM HOUSING COVER PORTION WITH REMOVEABLE KEYBOARD

(71) Applicant: Dell Products L.P., Round Rock, TX (US)

(72) Inventors: John T. Morrison, Round Rock, TX (US); Chiu-Jung Tsen, Zhubei City (TW); Yi-Ming Chou, Taipei City (TW); Chun-Wei Lin, Taoyuan City (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/035,158

(22) Filed: Jan. 23, 2025

(51) Int. Cl.
| | |
|---|---|
| *G06F 1/16* | (2006.01) |
| *G06F 3/02* | (2006.01) |
| *G06F 3/023* | (2006.01) |
| *G06F 3/0354* | (2013.01) |
| *G06F 3/038* | (2013.01) |

(52) U.S. Cl.
CPC ............ *G06F 1/1669* (2013.01); *G06F 3/021* (2013.01); *G06F 3/023* (2013.01); *G06F 3/03547* (2013.01); *G06F 3/038* (2013.01)

(58) Field of Classification Search
CPC ...... G06F 3/021; G06F 3/023; G06F 3/03547; G06F 3/038
See application file for complete search history.

(56) References Cited

U.S. PATENT DOCUMENTS

| | | | |
|---|---|---|---|
| 6,212,066 B1 * | 4/2001 | Fetterman | ............. G06F 1/1662 361/679.08 |
| 9,117,437 B2 | 8/2015 | Chin et al. | |
| 11,160,161 B2 | 10/2021 | Seo et al. | |
| 11,936,115 B2 | 3/2024 | Kim et al. | |
| 12,189,437 B2 | 1/2025 | Morrison et al. | |
| 2003/0059242 A1 * | 3/2003 | Horiuchi | ............... G06F 1/1616 400/489 |
| 2012/0134117 A1 * | 5/2012 | Lin | ....................... G06F 1/1662 361/747 |
| 2024/0201750 A1 | 6/2024 | Morrison et al. | |

(Continued)

OTHER PUBLICATIONS

AMD, "Model Pipelining on NPU and GPU using Ryzen AI Software," Aug. 2, 2024, downloaded from https://www.amd.com/en/developer/resources/technical-articles/model-pipelining-on-npu-and-gpu-using-ryzen-ai-software.html on Jul. 28, 2025, 8 pages.

(Continued)

*Primary Examiner* — Ariel A Balaoing
(74) *Attorney, Agent, or Firm* — Zagorin Cave LLP; Robert W. Holland

(57) ABSTRACT

A portable information handling system housing secures a cover over a main portion with a keystone releasable to access the housing interior. A speaker in the housing interior operates as a keystone that releases internal components by pressing a battery against a motherboard and cooling fan. A dNPU slot accepts a dNPU card with a latch biased to a secured position and having a handle that presses away from the dNPU slot to release the dNPU card. Logic executing on processing resources of the information handling system manage allocation of tasks to artificial intelligence resources for efficient application of the resources to end user goals.

19 Claims, 38 Drawing Sheets

(56)　　　　　　References Cited

U.S. PATENT DOCUMENTS

| 2024/0257076 A1 | 8/2024 | Morrison et al. |
| 2025/0138596 A1 | 5/2025 | Files et al. |

OTHER PUBLICATIONS

Microsoft, "A guide to CPU, GPU, NPU, and Windows," downloaded from https://www.microsoft.com/en-us/windows/learning-center/cpu-gpu-npu-windows on Jul. 28, 2025, 5 pages.

Mann, T., "Where does Microsoft's NPU obsession leave Nvidia's AI PC ambitions?," Jan. 20, 2025, downloaded from https://www.theregister.com/2025/01/20/microsoft_nvidia_ai_pcs/ on Jul. 28, 2025, 2 pages.

Muns, A., "Extensibility in AI: Adapting to New Tasks Effortlessly," downloaded from https://telnyx.com/learn-ai/extensibility-in-ai on Jul. 28, 2025, 5 pages.

Kim, J., et al., "Improving Data Reuse in NPU on-chip Memory with Interleaved Gradient Order for DNN Training," ACM, Oct. 28-Nov. 1, 2023, Toronto, ON Canada, 14 pages.

U.S. Appl. No. 18/081,155, filed Dec. 14, 2022, entitled "Portable Information Handling System Keyboard Assembly Having Separable Palm Rest," by inventors Jace W. Files et al.

* cited by examiner

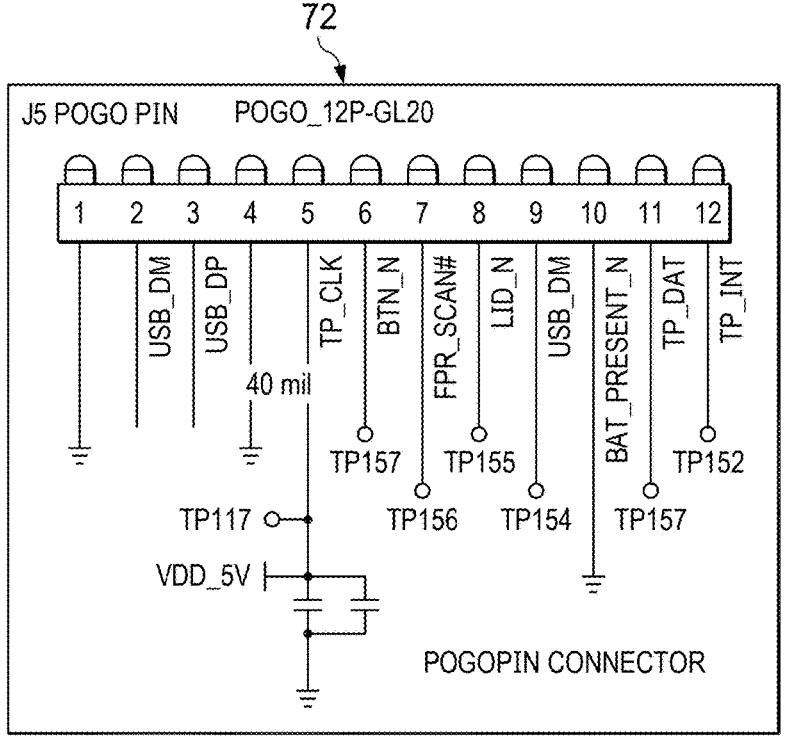
| | PIN | |
|---|---|---|
| 1 | VDD_3.3V | |
| 2 | PWR_KEY | |
| 3 | USB_DM | |
| 4 | USB_DP | |
| 5 | GND | |
| 6 | LID_CLOSED# | |
| 7 | FPR_SCAN | |
| 8 | GND | |
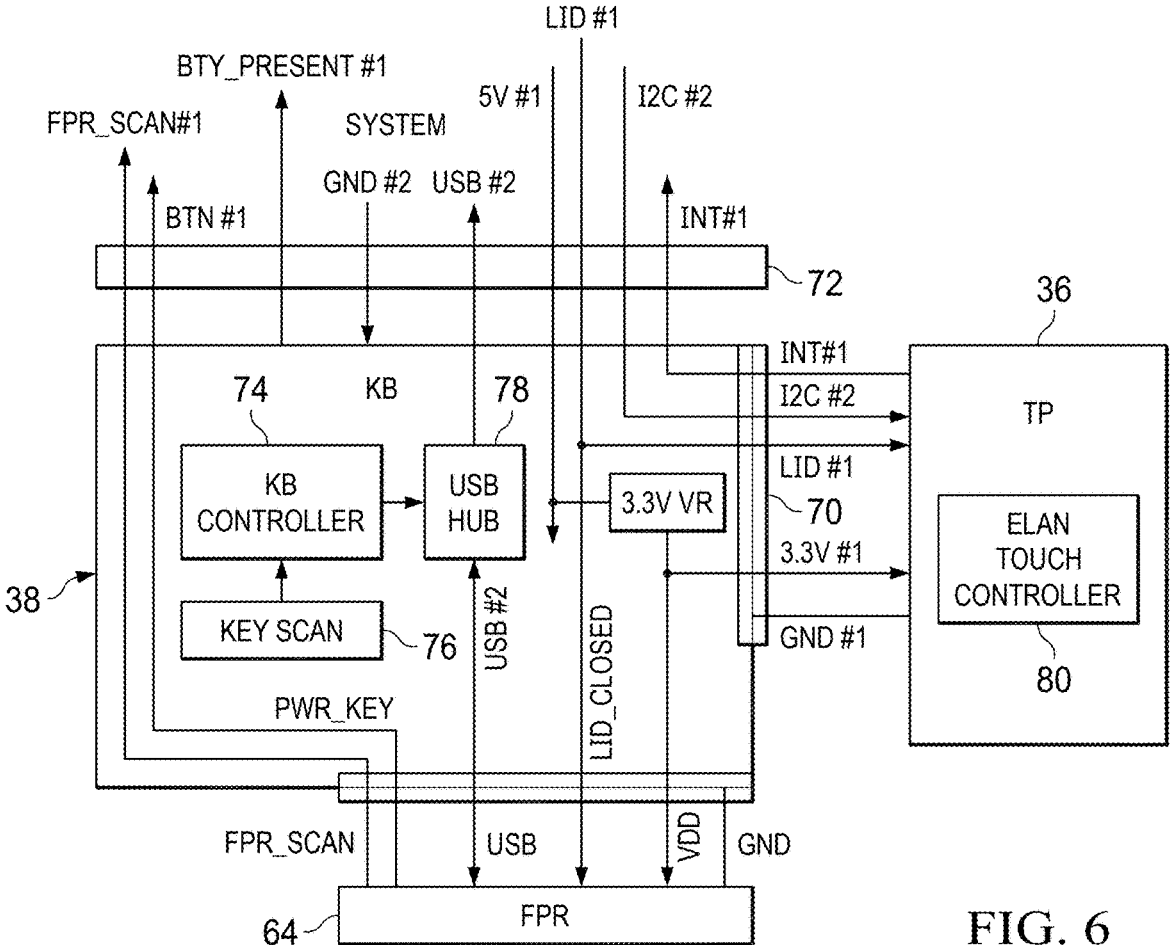
FIG. 6

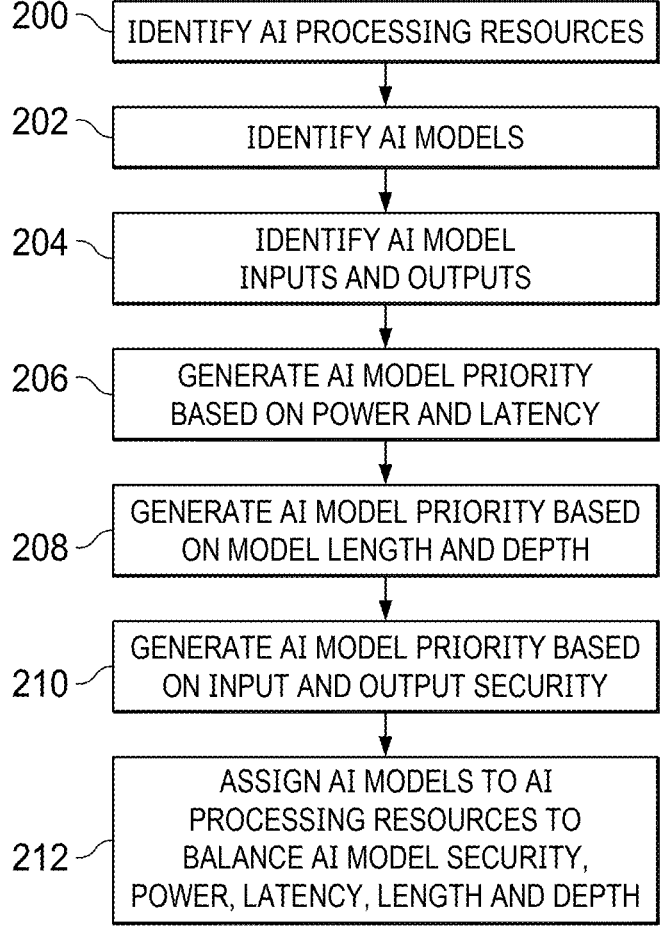

200 IDENTIFY AI PROCESSING RESOURCES

202 IDENTIFY AI MODELS

204 IDENTIFY AI MODEL INPUTS AND OUTPUTS

206 GENERATE AI MODEL PRIORITY BASED ON POWER AND LATENCY

208 GENERATE AI MODEL PRIORITY BASED ON MODEL LENGTH AND DEPTH

210 GENERATE AI MODEL PRIORITY BASED ON INPUT AND OUTPUT SECURITY

212 ASSIGN AI MODELS TO AI PROCESSING RESOURCES TO BALANCE AI MODEL SECURITY, POWER, LATENCY, LENGTH AND DEPTH

FIG. 24

PORTABLE INFORMATION HANDLING SYSTEM HOUSING COVER PORTION WITH REMOVEABLE KEYBOARD

BACKGROUND OF THE INVENTION

Field of the Invention

The present invention relates in general to the field of information handling systems, and more particularly to a portable information handling system housing cover portion with removeable keyboard.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recent developments in artificial intelligence (AI) have helped to make portable information handling systems a more powerful tool. In a typical scenario, a portable information handling system interfaces with an AI model running on a server information handling system through a network, such as WIFI or an Ethernet LAN, to supplement operations performed at the portable information handling system. AI models tend to have computationally intensive operations that use a good deal of power and large amounts of data. High power consumption tends to generate excess thermal energy when AI models are executing. Excess thermal energy may also result where large amounts of information are communicated to support AI, such as through a mmWave RF Front-End (RFFE) antenna. In some situations, using remote AI resources can present a security problem where sensitive data is involved, especially where a risk exists that the AI model will incorporate the sensitive data.

As AI has improved and proven flexible to accomplish a variety of tasks, information handling system manufacturers have sought to include AI resources within an information handling system. These local resources include embedded neural processing units (NPU) that operate at a nominal 45 terra operations per second (TOPS) and local discrete NPUs that operate at a nominal 200 TOPS. Other resources that can execute AI models include embedded and discrete graphics processing units (GPU) and central processing units (CPUs). When available locally, these AI resources can perform tasks such as optimizing audio with noise cancellation and with three-dimensional capture and presentation; optimizing video with improved video quality and object recognition; and performing content tracking by note taking and scheduling of action items from the audio and video. As an example, these tasks can integrate in an information handling system operating system to automate task management during a videoconference. At the same time, other AI models running locally or through a network can perform tasks that include system housekeeping, like telemetry to monitor system operations and AI agents that answer end user queries, such as Co-Pilot.

One difficulty with incorporation of AI resources in a portable information handling system is that the system housing tends to be compact to enhance mobility so that including additional processors and thermal cooling can consume excessive footprint in the housing. Access to the housing interior tends to be restricted where additional components might be included and removed. This leaves end users to wrestle with what can be ungainly housing structures to open the housing, reconfigure the housing with AI resources, and close the housing again.

SUMMARY OF THE INVENTION

Therefore, a need has arisen for a system and method which improves end user access to a portable information handling system housing interior.

A further need exists for a system and method that adapts thermal cooling to address specific components within a portable information handling system housing.

A further need exists for a discrete NPU card insertion and removal in a portable information handling system housing.

A further need exists for management of AI resource use within a portable information handling system to achieve end user priorities.

In accordance with the present invention, a system and method are provided which substantially reduce the disadvantages and problems associated with previous methods and systems that incorporate AI resources within a portable information handling system. Toolless attachment and removal of a keyboard cover provides access to processing components in a portable housing including a discrete neural processing unit (dNPU) to adapt the system to desired artificial intelligence (AI) capabilities.

More specifically, a portable information handling system housing couples a cover portion over a main portion that contains processing components, such as a processor that executes instructions to process information in cooperation with a memory that stores the instructions and information. The housing cover portion slides to engage in the housing main portion and includes a slot that accepts a keyboard having a tab that engages a rib of the cover portion to hold the keyboard in place. The tab and housing cover portion have a keystone that fits in place to hold the cover portion and keyboard in place. Within the housing a speaker module fits in a front part of the housing main portion to work against a battery and motherboard and thereby hold the internal housing components in position. A cooling fan fits into a slot formed in the motherboard to rest an EMI gasket on the housing main portion bottom surface and aligns contacts of the cooling fan with contacts of the motherboard for cooling fan power and control. A spring latch compresses the cooling fan against the housing main portion bottom surface for toolless coupling and decoupling of the cooling fan in the housing. A dNPU latch biased to a latched position presses against a dNPU card to hold the dNPU edge connector in an edge connector slot, such as an M.2 edge connector and slot. In addition to a dNPU, the portable information handling system includes a variety of AI processing resources including embedded NPUs, embedded GPUs, discrete GPUs and network accessible resources such as cloud-based NPUs. The different AI processing resources are managed locally to optimize an end user experience, such as by mapping AI processing resources to AI tasks based on power, latency and security requirements.

The present invention provides a number of important technical advantages. One example of an important technical advantage is that a portable information handling system manages AI tasks locally with configurable AI processing resources. The portable housing interior is accessible with toolless removal of a cover portion and keyboard so that dNPU is inserted to provide additional AI processing resources securely interfaced through an M.2 connector held in place by a dNPU latch. Available AI processing resources are mapped to AI tasks executed by AI models to optimize performance and latency while maintaining security based on the type of model, the model inputs and model outputs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

4

Figure 7:
Figure 7A:
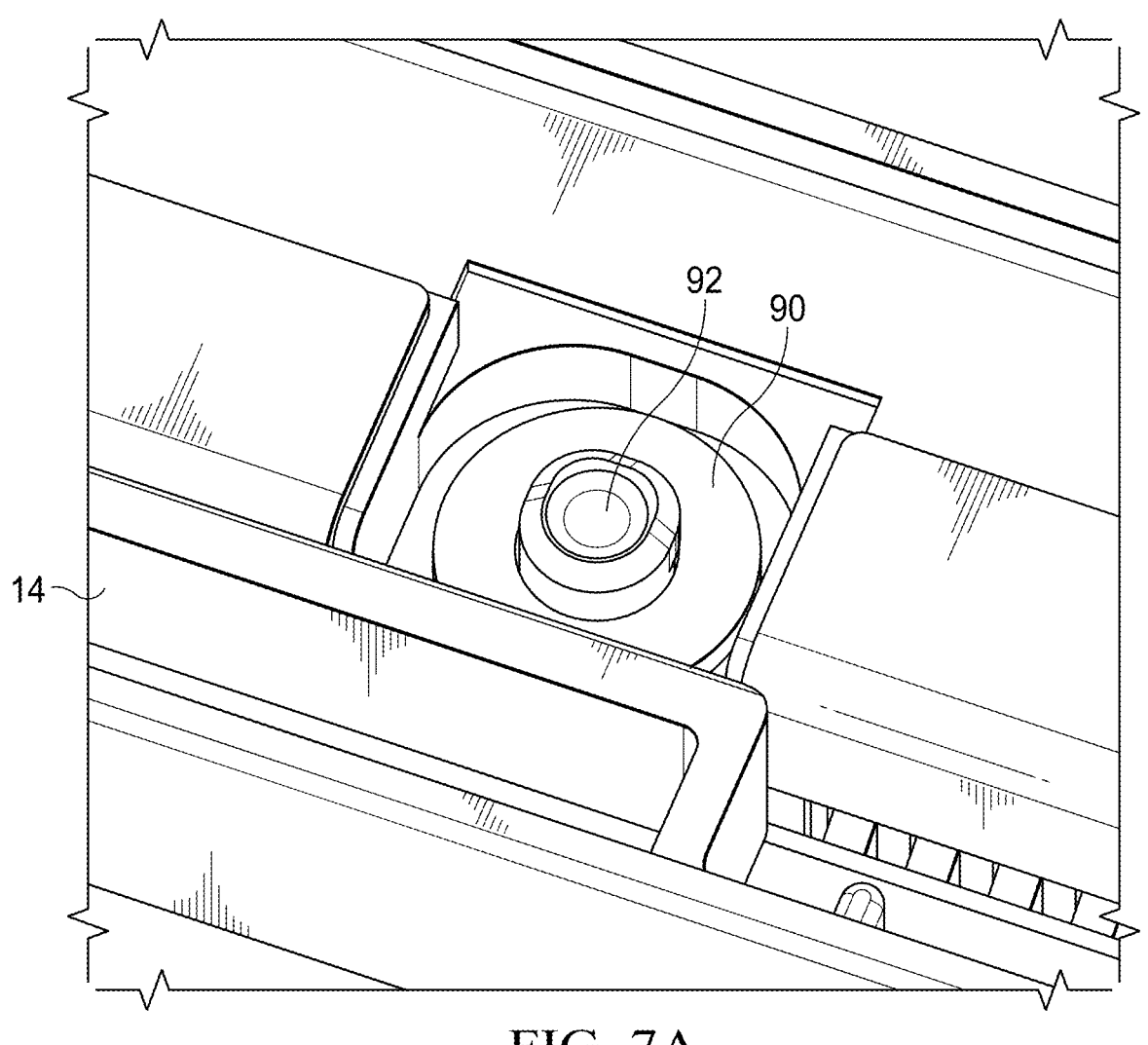
Figure 8:
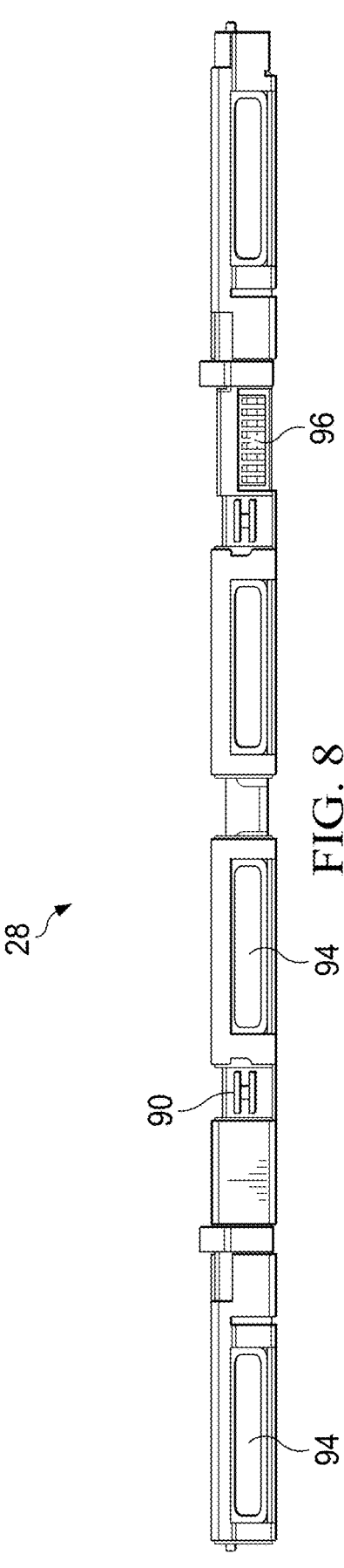
Figure 9:
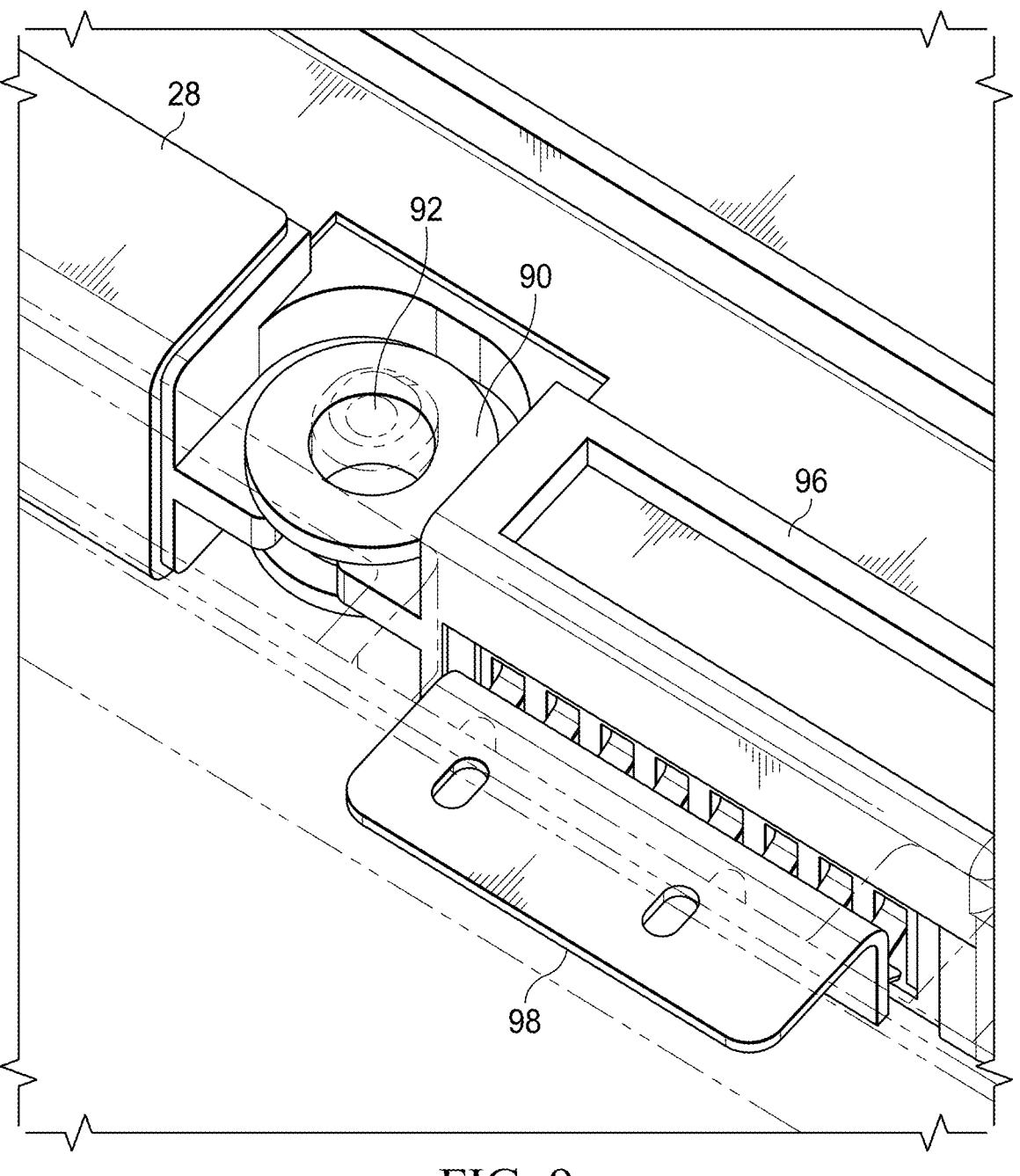
Figure 10:
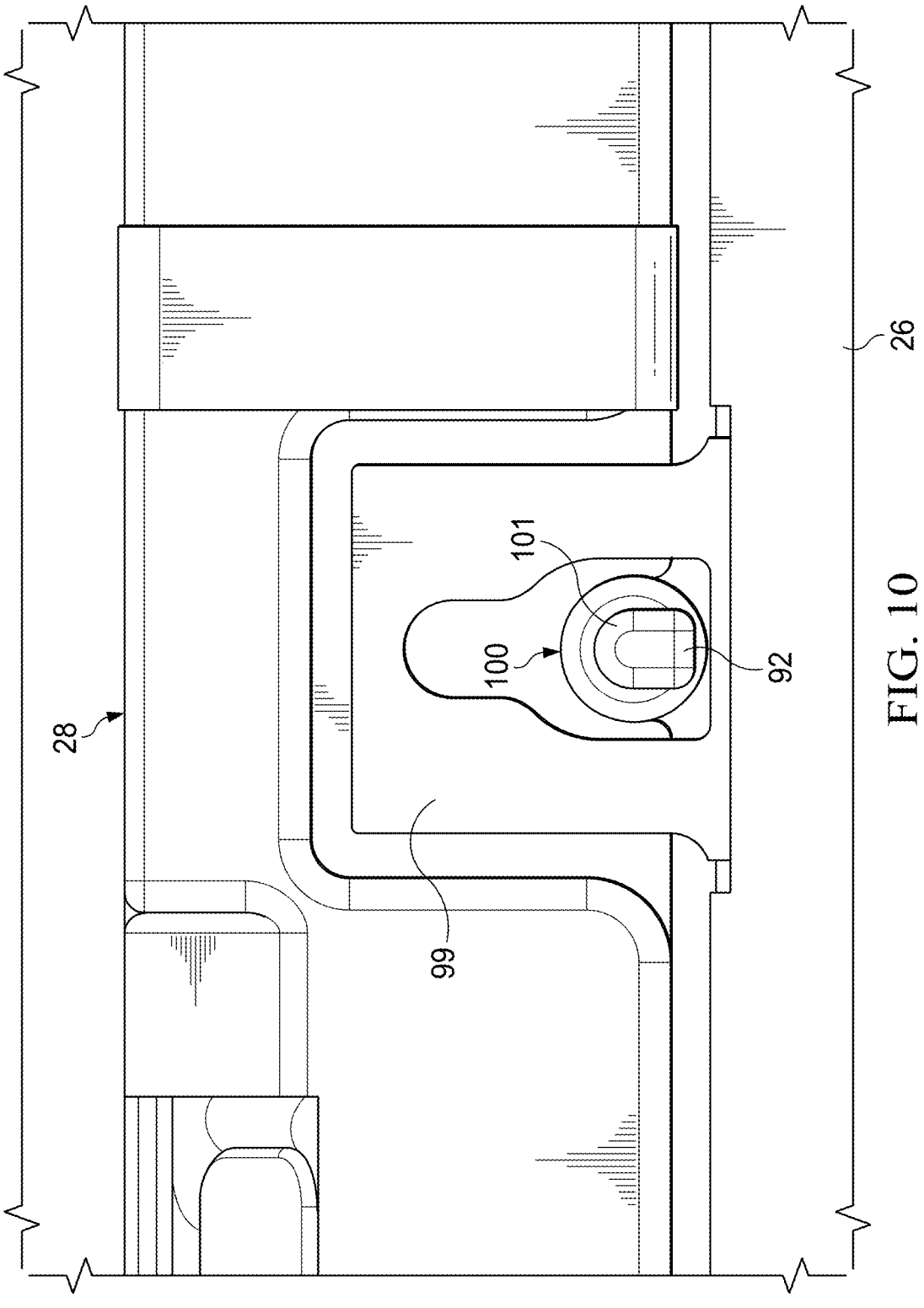
Figure 11A:
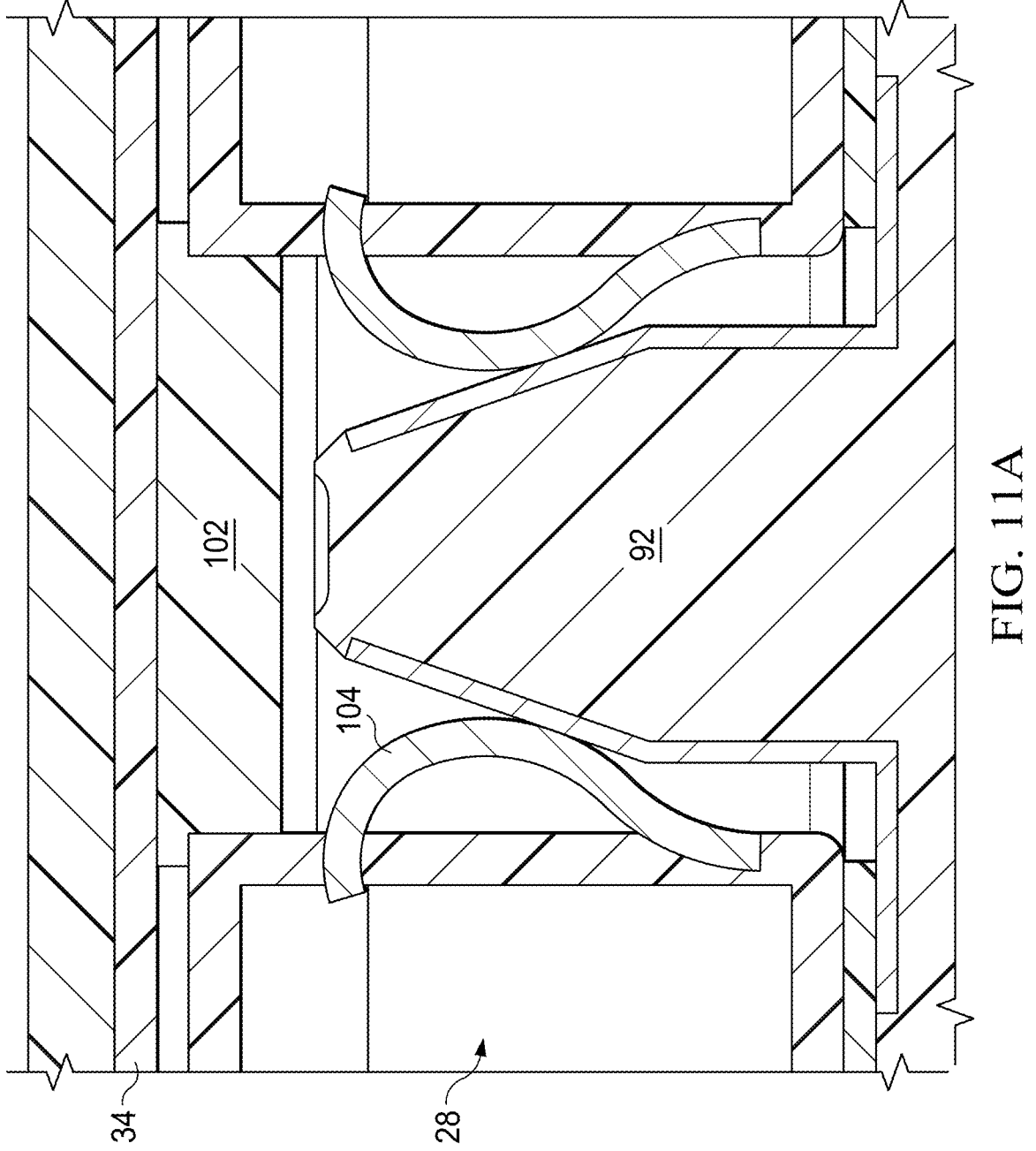
Figure 11B:
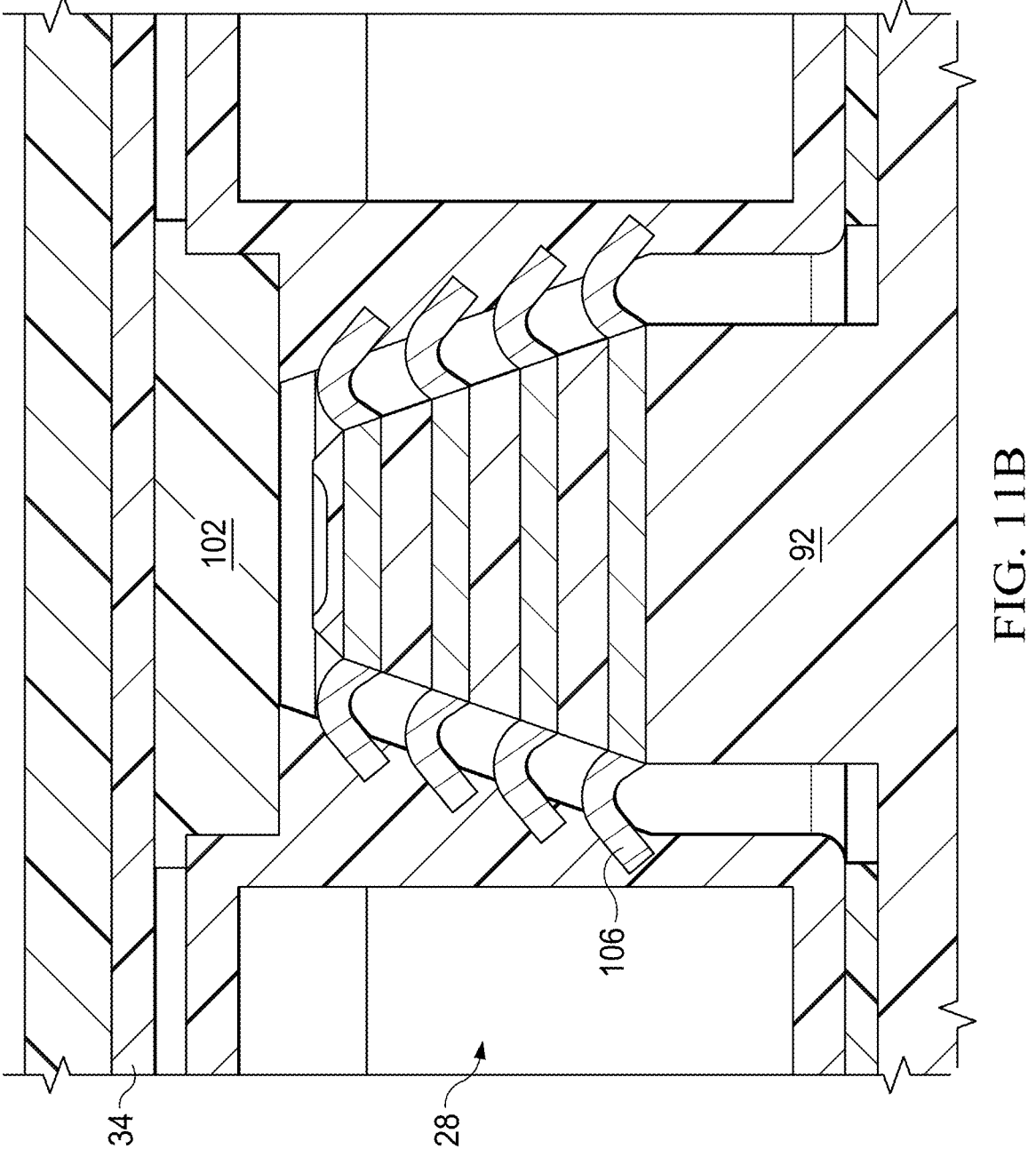
Figure 12:
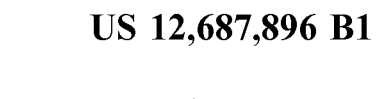
Figure 13:
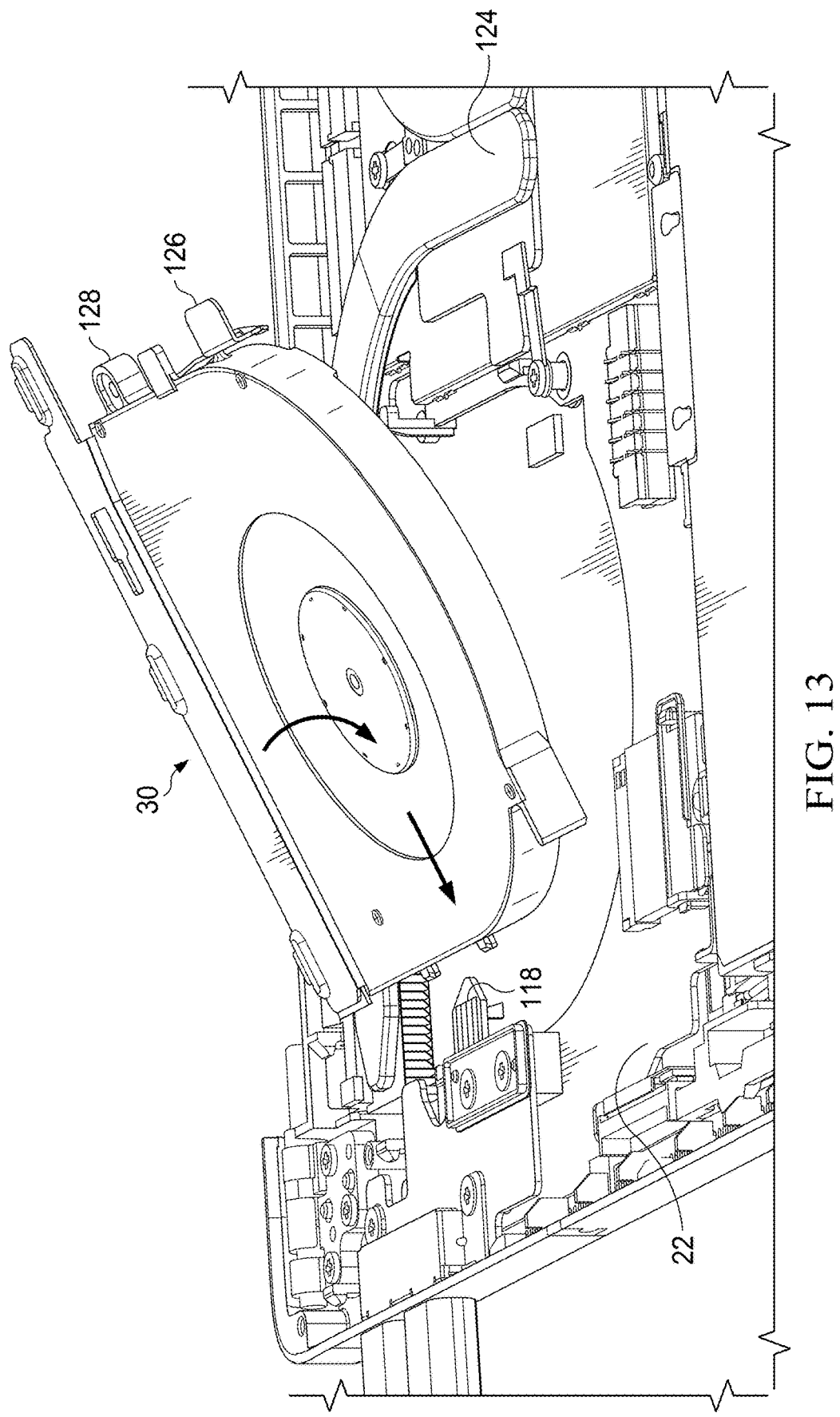
Figure 14:
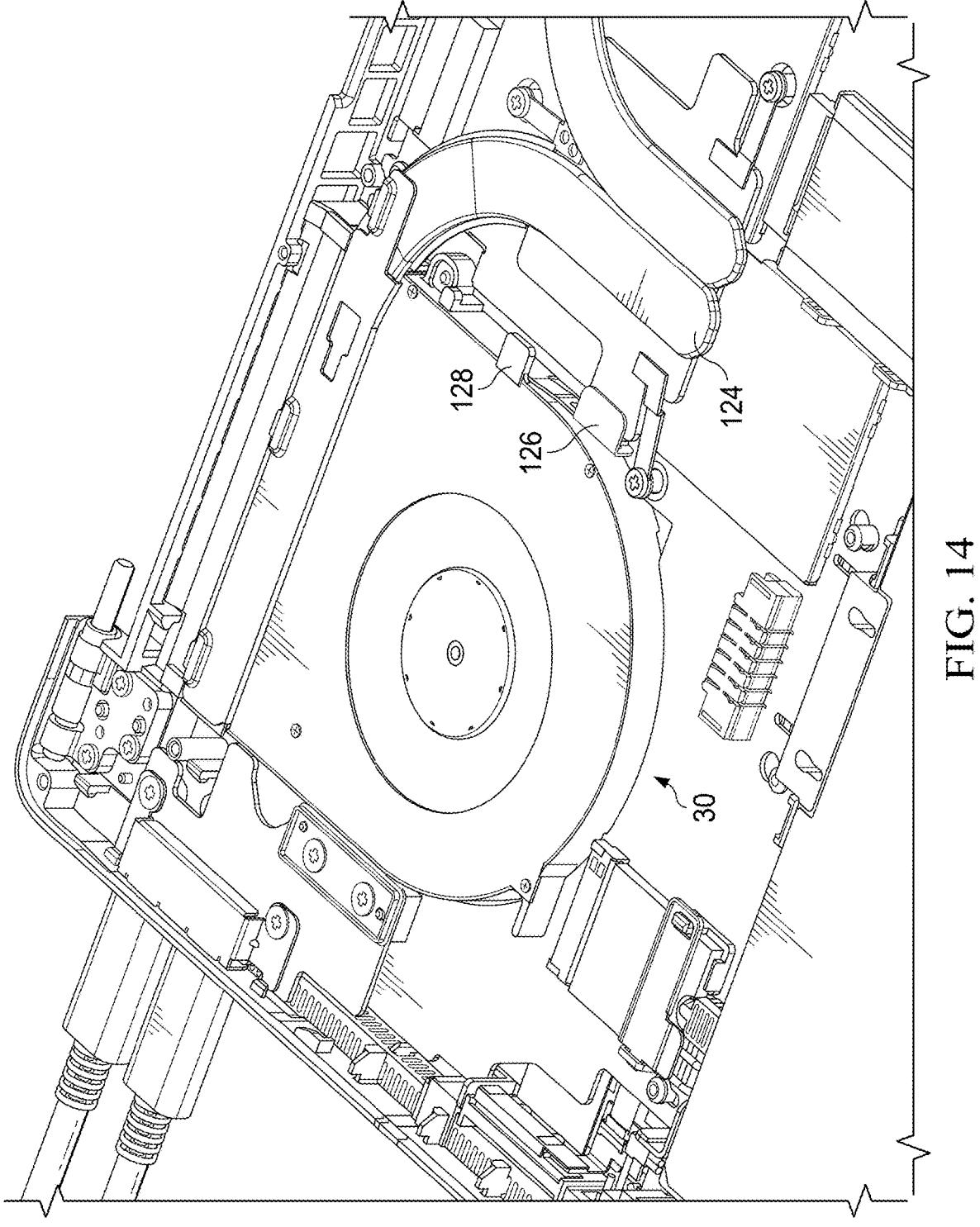
Figure 15:
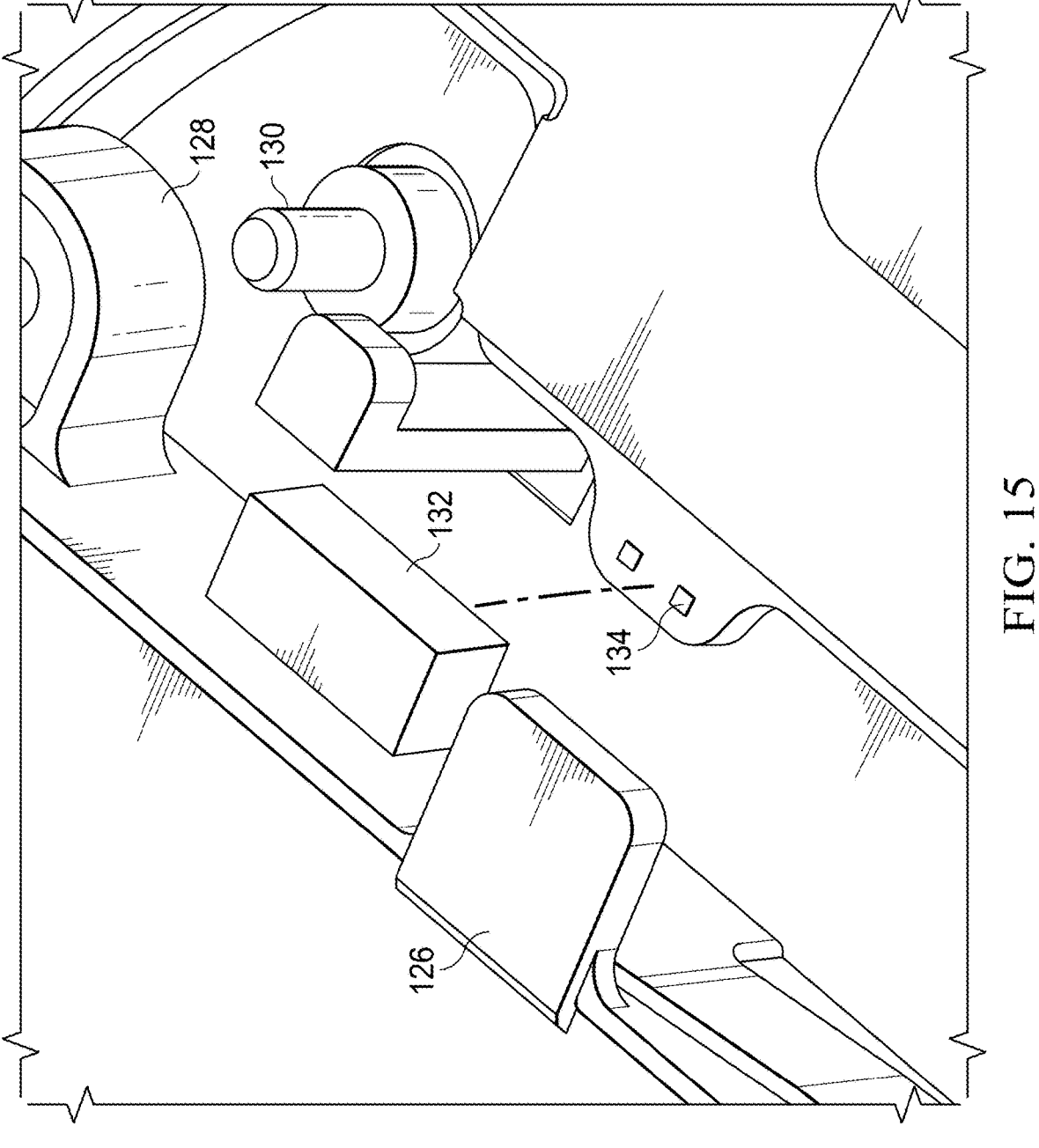
Figure 16:
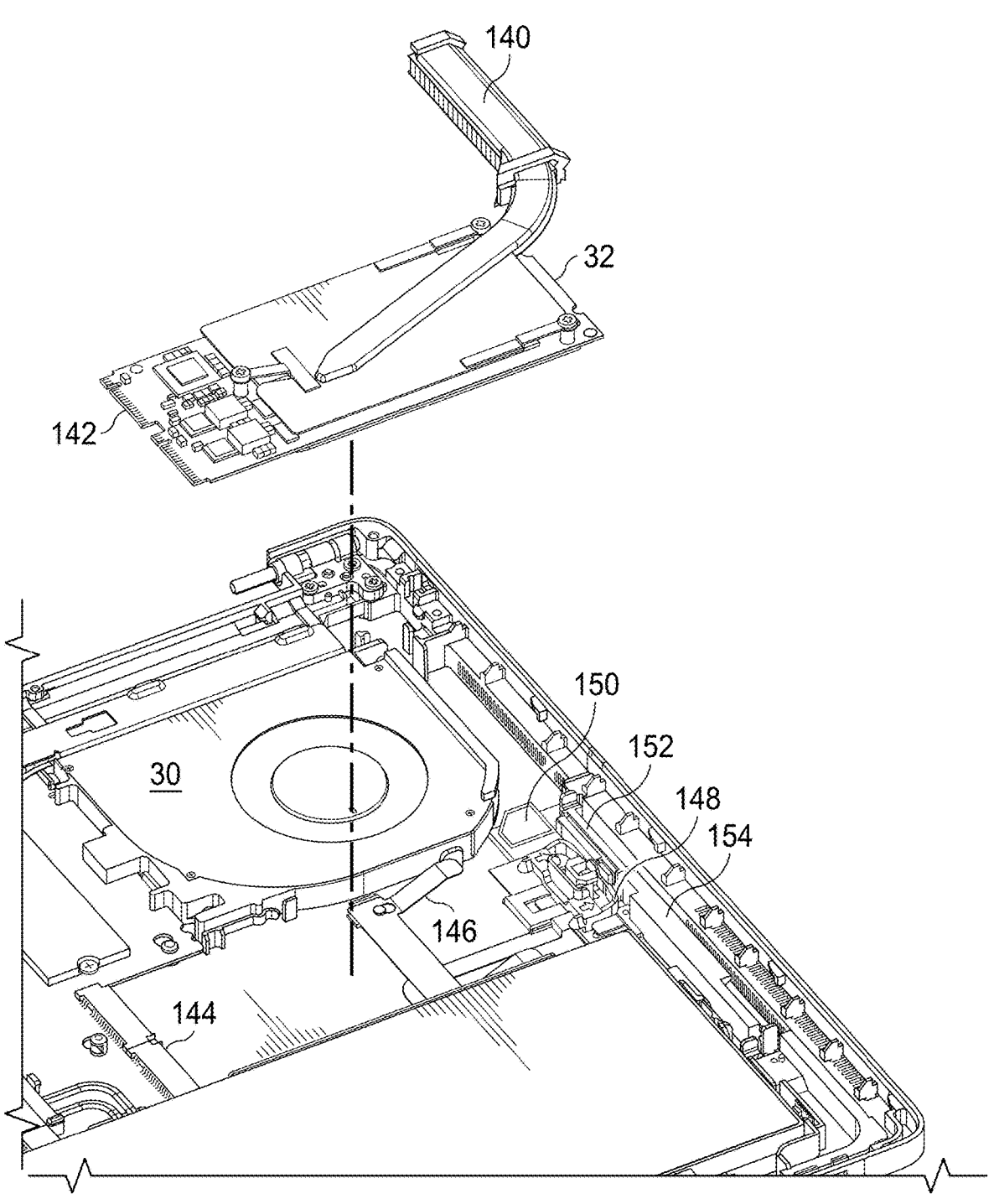
Figure 17:
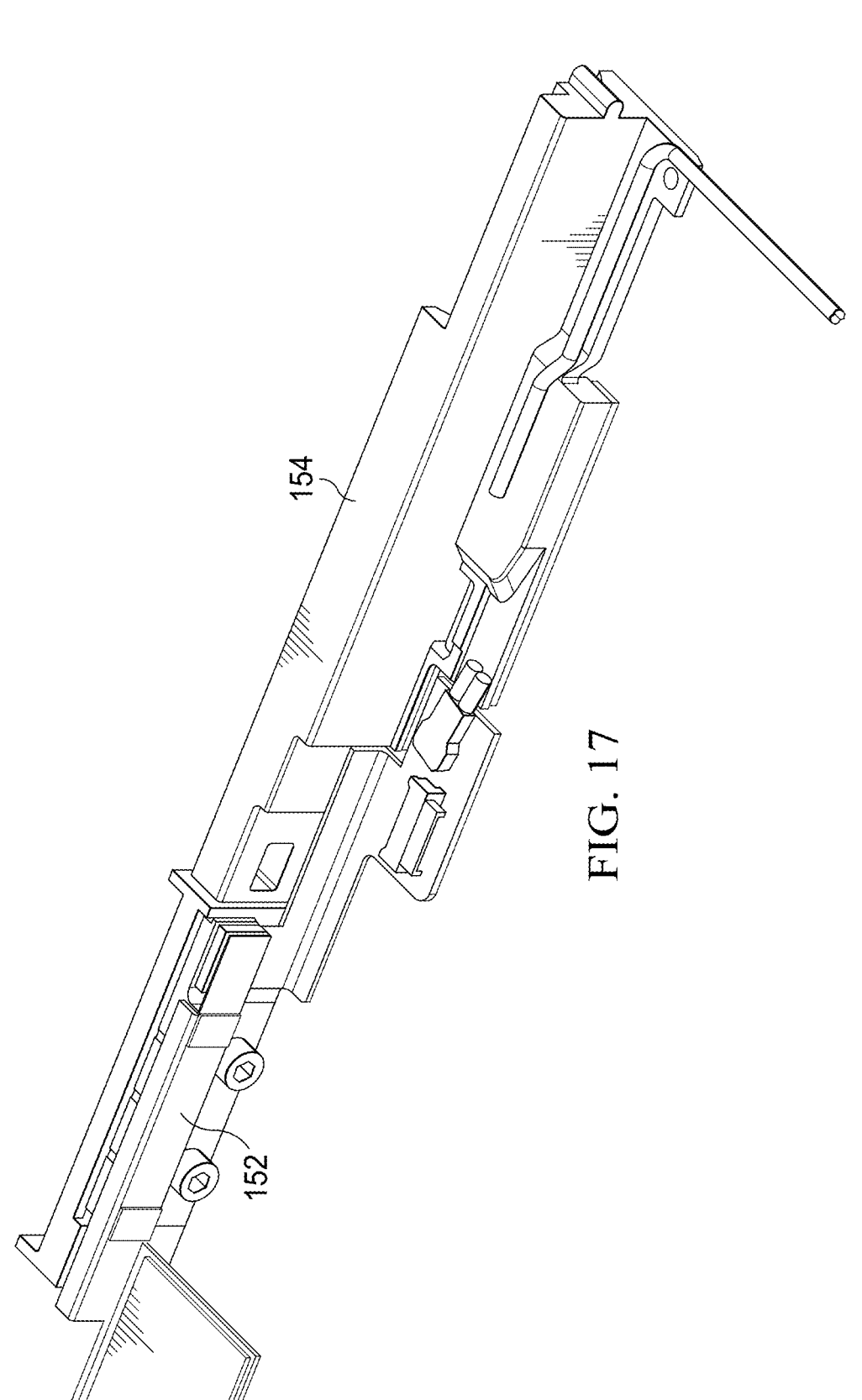
Figure 18:
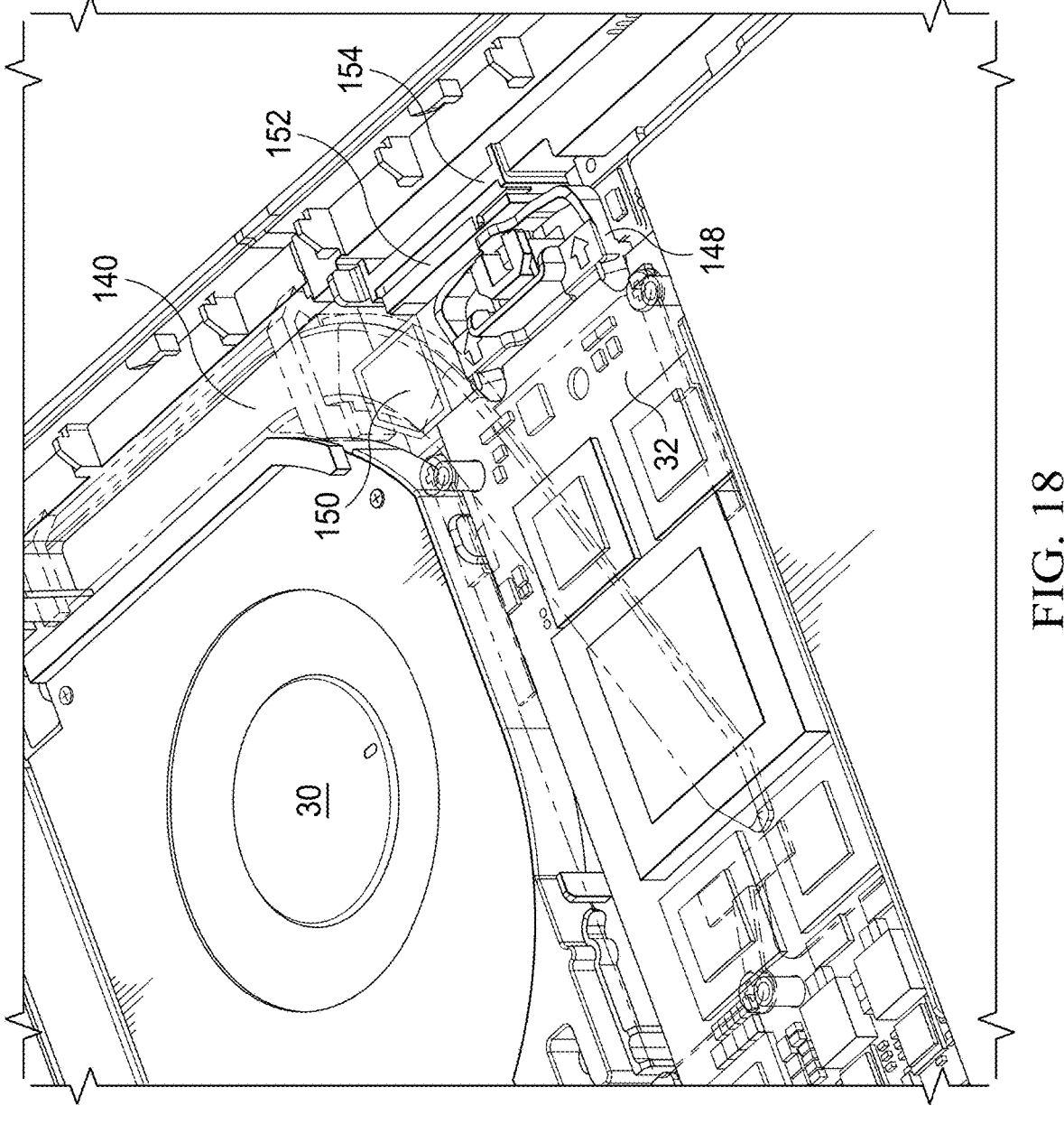
Figure 18A:
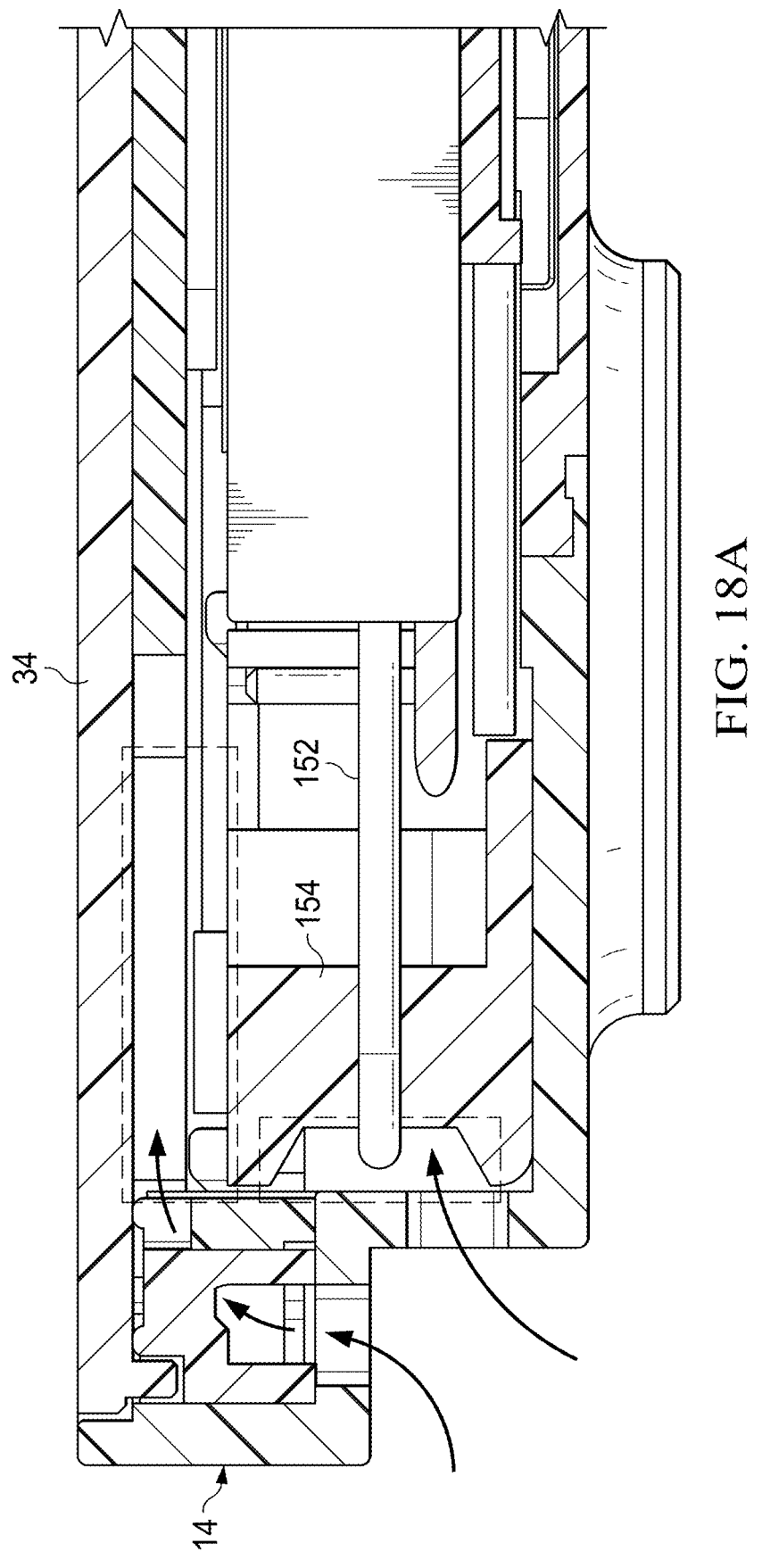
Figure 19:
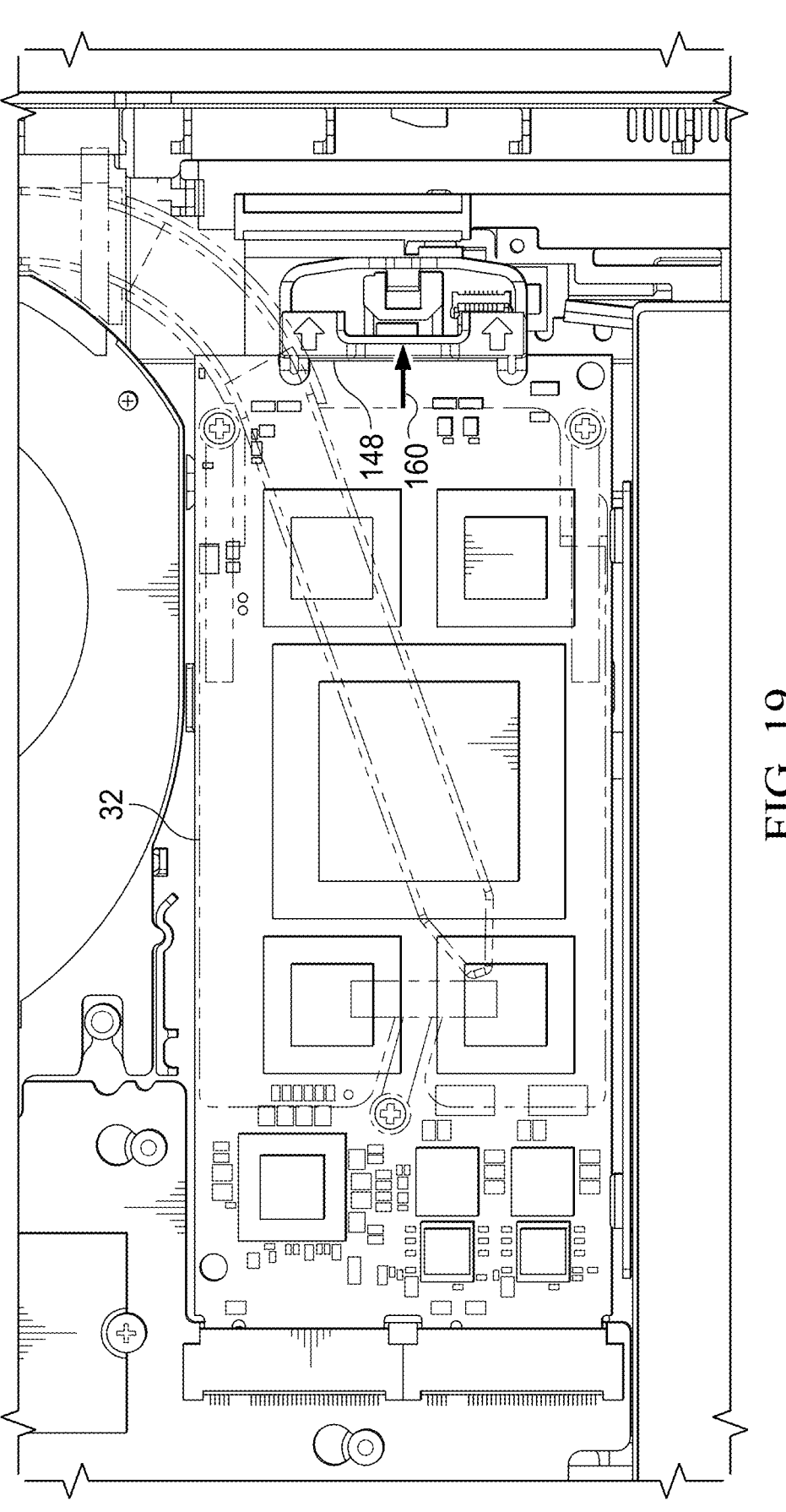
Figure 19A:
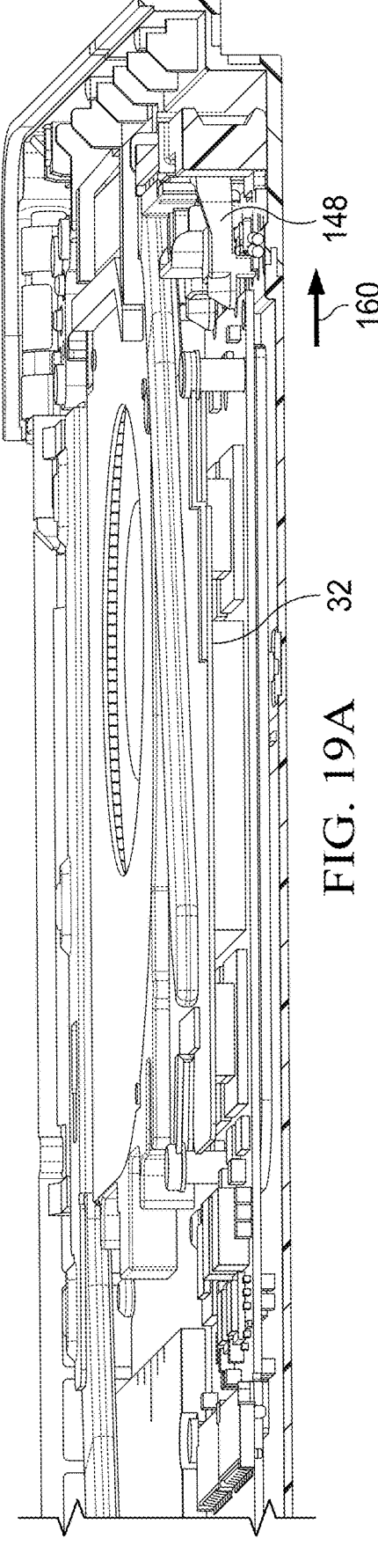
Figure 19B:
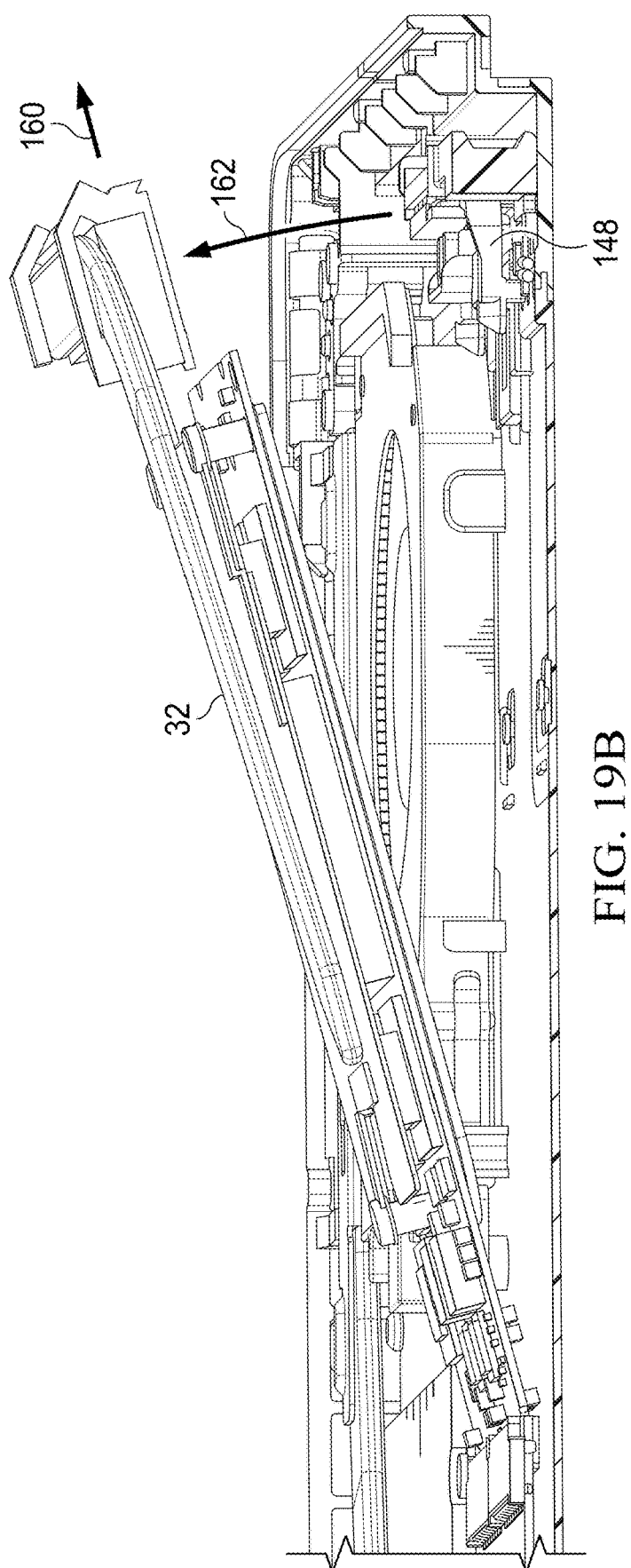
Figure 20A:
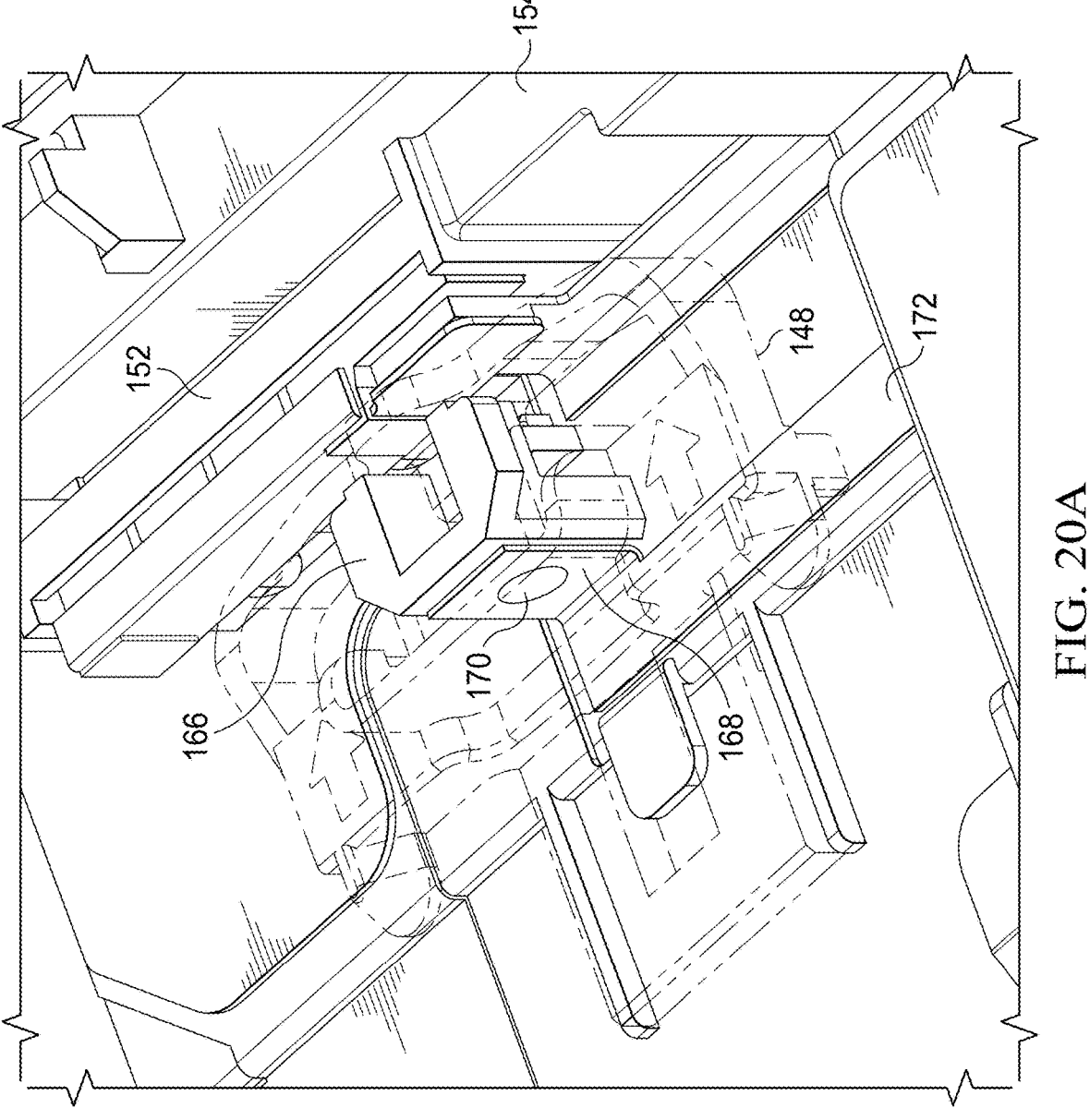
Figure 20B:
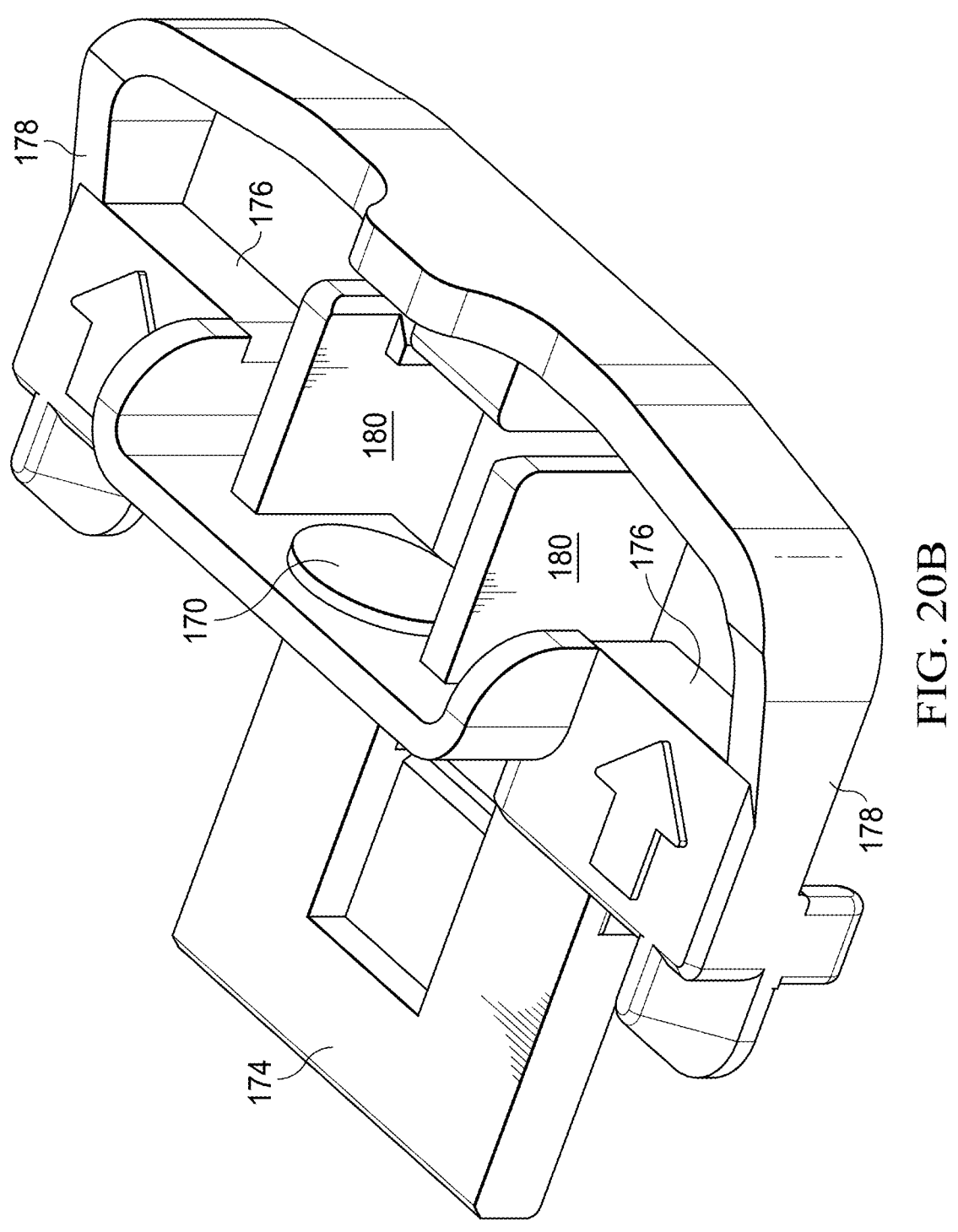
Figure 21:
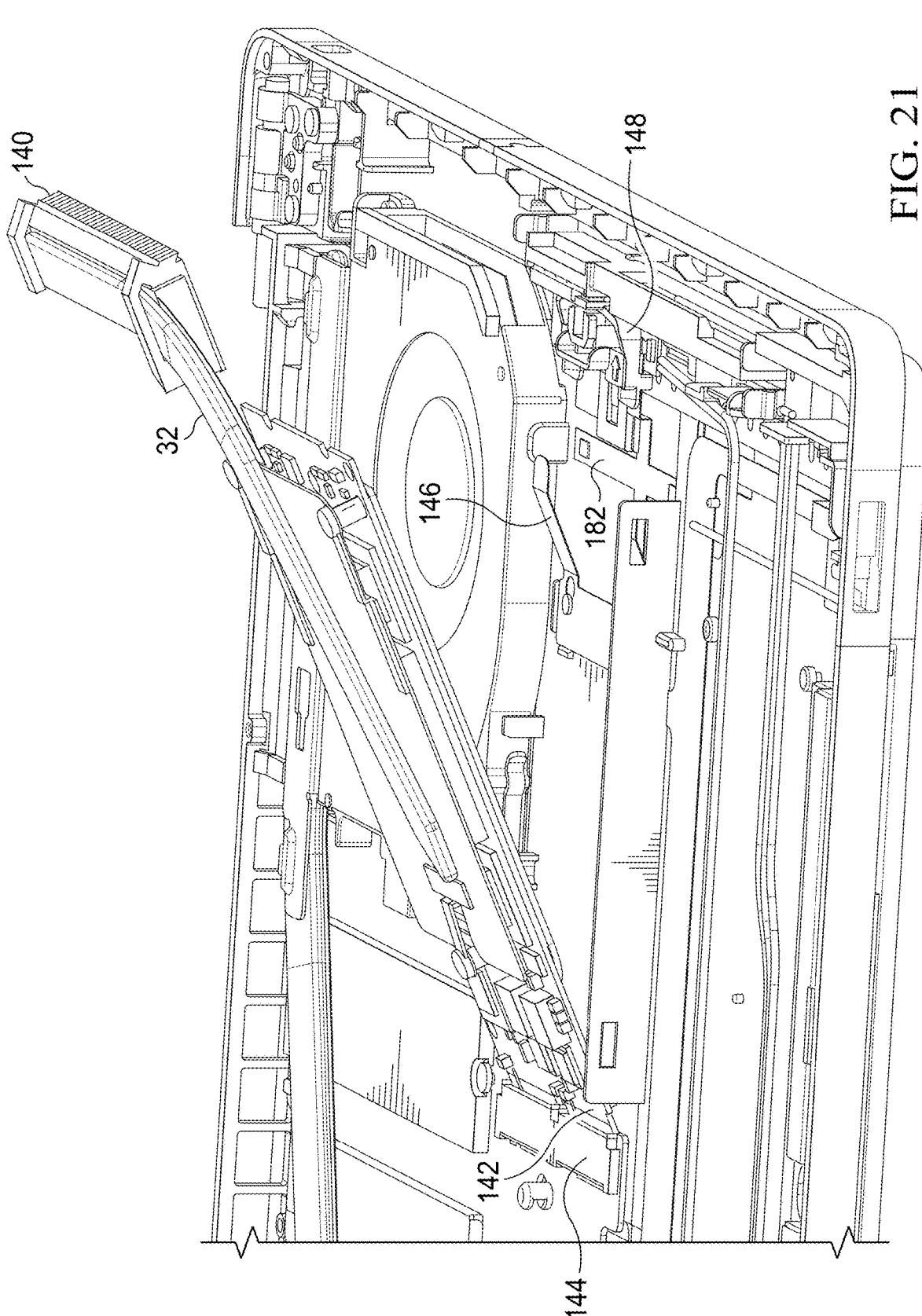
Figure 21A:
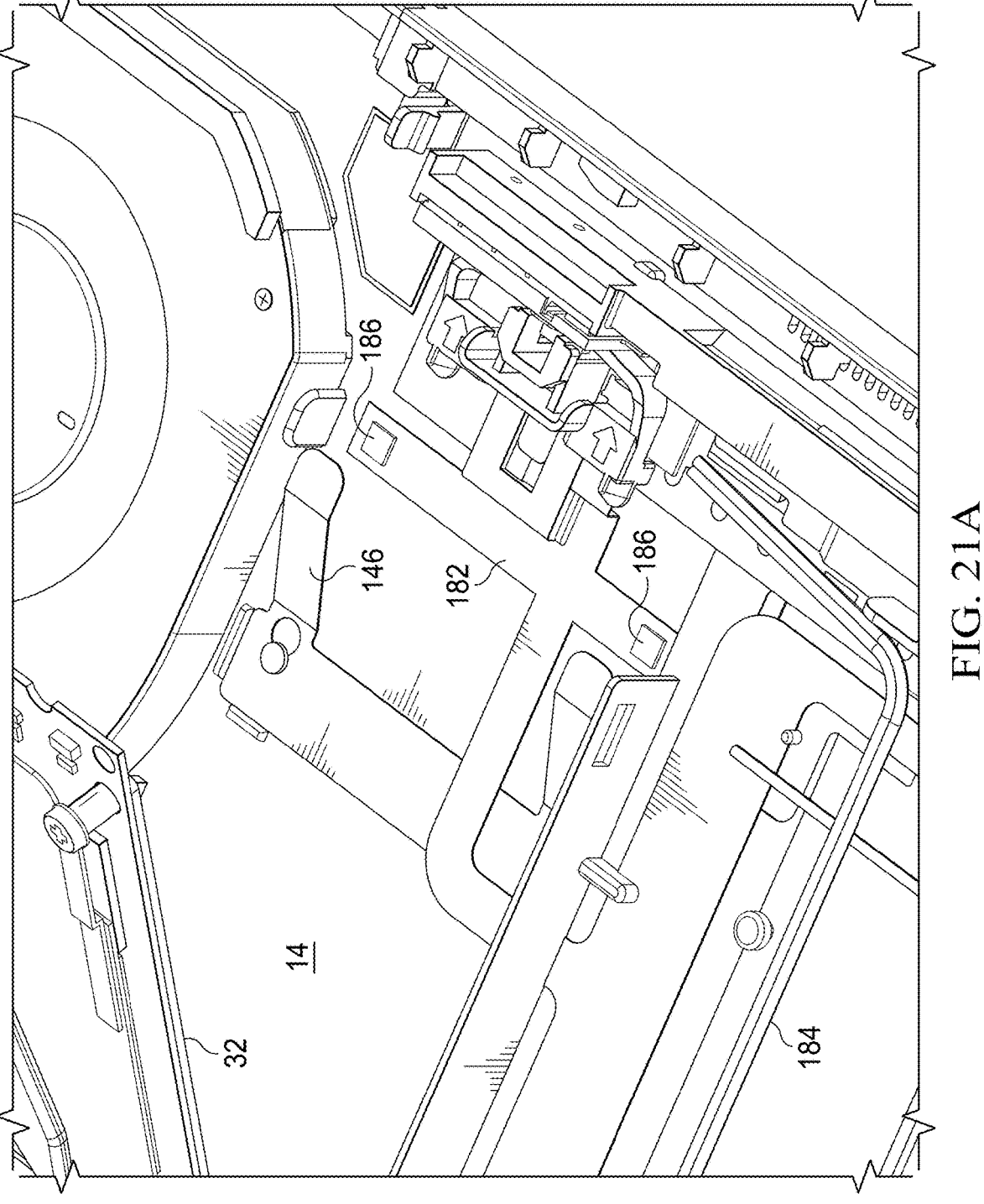
Figure 22:
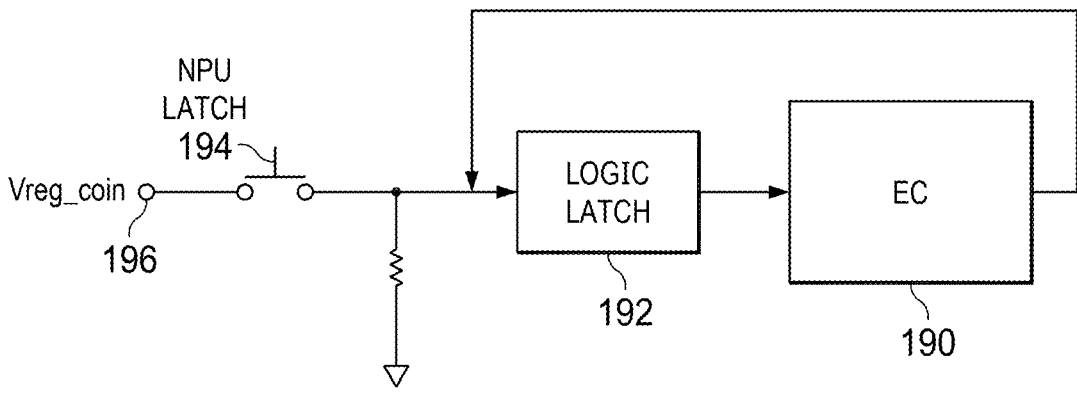
Figure 23:
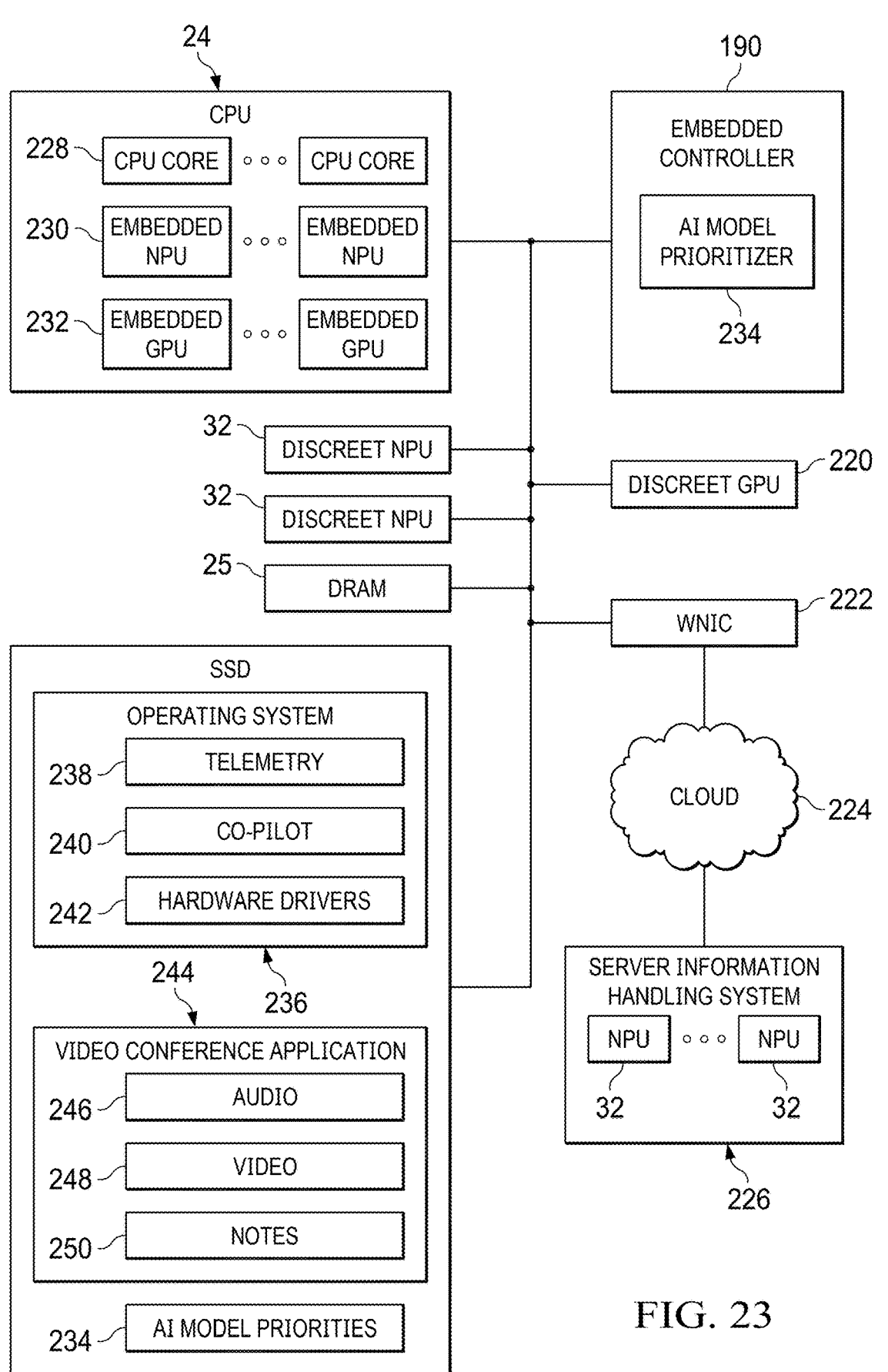
Figure 25:
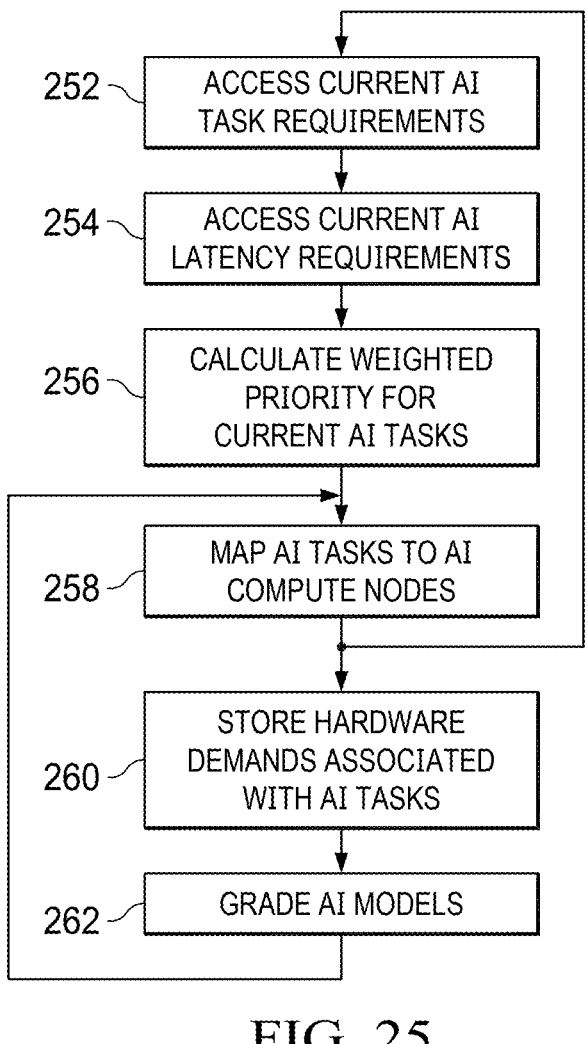

FIG. 6 depicts a block diagram of an example embodiment of components in the keyboard circuit board to support communication between the keyboard, touchpad and motherboard;

FIGS. 7 and 7A depict an example embodiment of a speaker module used as an internal keystone that holds a battery and motherboard assembly in a fixed position within a housing main portion;

FIG. 8 depicts a front side view of the speaker elements that assemble to form the speaker module;

FIG. 9 depicts an upper perspective view of the speaker module assembled in the housing main portion with the contact springs pressing against the contact pads;

FIG. 10 depicts a top view of contact of the speaker module against the battery to hold the battery in position within the housing main portion;

FIGS. 11A and 11B depict side sectional views of various embodiments of alignment pin insertion into a speaker module alignment opening;

FIG. 12 depicts an upper perspective exploded view of a cooling fan configured to insert into the housing main portion in a toolless manner;

FIG. 13 depicts a rotating installation of the cooling fan to interface with the motherboard;

FIG. 14 depicts a top view of the cooling fan fully installed at the motherboard with the spring latch holding the cooling fan in place with a compression force;

FIG. 15 depicts a detailed upper perspective view of an example embodiment of the cooling fan latch and insert detection sensor;

FIG. 16 depicts an upper perspective view of a discrete NPU (dNPU) configured to insert into a slot of the housing main portion and having a thermal heat pipe assembly that includes a millimeter (mm) wave antenna;

FIG. 17 depicts a side perspective view of the antenna assembly prepared to insert into the housing main portion;

FIGS. 18 and 18A depict the antenna assembly coupled into place in the housing main portion to direct air flow from an intake vent through the antenna assembly and into the housing main portion;

FIGS. 19, 19A and 19B depict a dNPU installed in the dNPU slot and held in position by a dNPU latch;

FIGS. 20A and 20B depict an upper perspective view of the dNPU latch in a transparent manner at the dNPU slot and separate from the dNPU slot;

FIGS. 21 and 21A depict an upper perspective view of an alternative dNPU latch actuation sensor to detect dNPU removal;

FIG. 22 depicts a circuit block diagram of an example circuit for detection of dNPU accesses at a dNPU slot;

FIG. 23 depicts a block diagram of a system that manages AI instruction execution by selected of plural AI processing resources;

FIG. 24 depicts a flow diagram of a process for managing AI instruction execution by selected of plural AI processing resources; and FIG. 25 depicts a flow diagram of a process for allocating AI task to AI processing resources based on AI models, AI priorities and AI latency.

DETAILED DESCRIPTION

A portable information handling system adapts to support plural NPU resources and to manage AI instruction allocation to the NPU resources. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
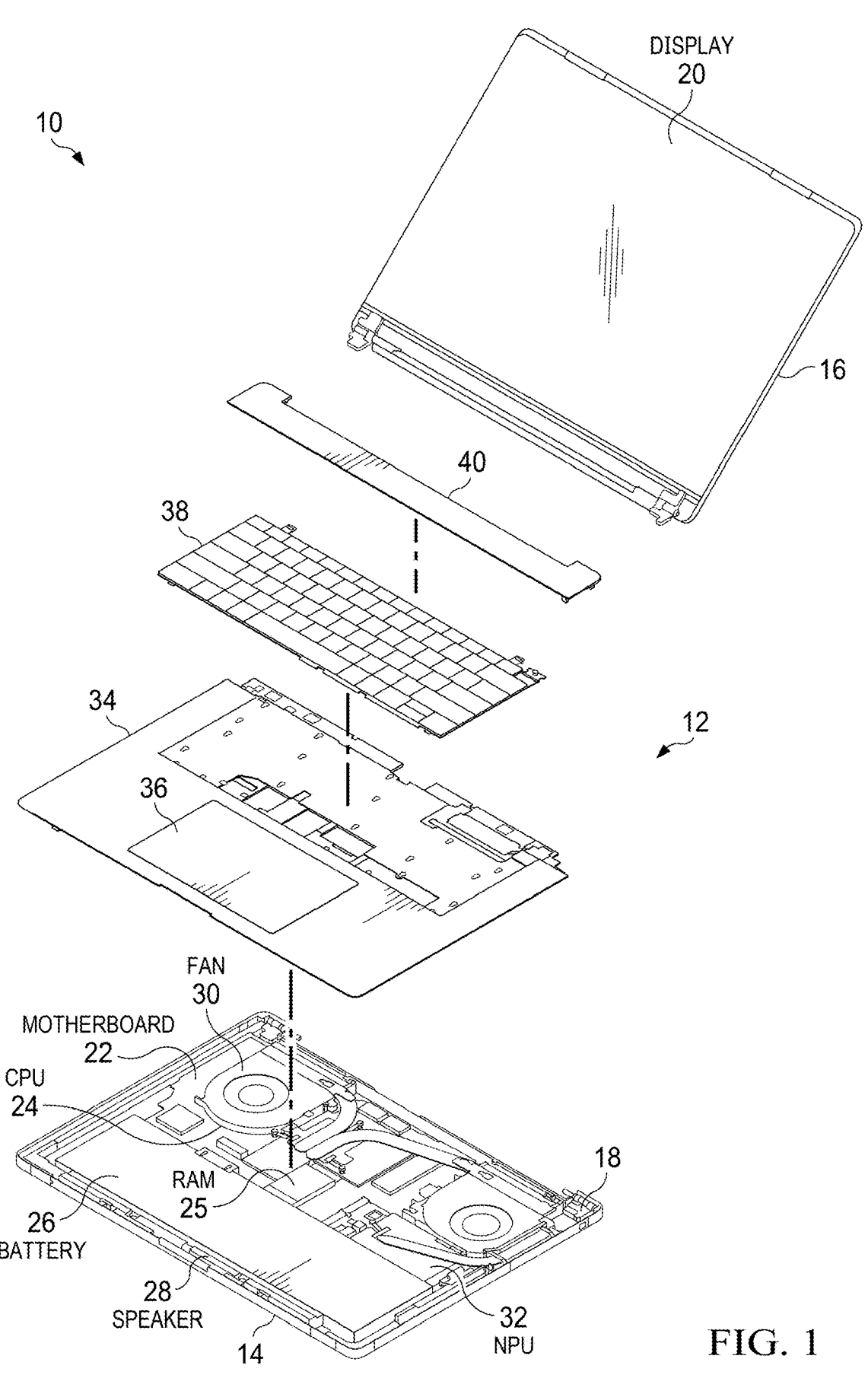
FIG. 1 depicts an upper perspective exploded view of a portable information handling system housing main portion having a removeable keyboard and touchpad.

Referring now to FIG. 1, an upper perspective exploded view depicts a portable information handling system 10 housing 12 having a removeable keyboard 38 and touchpad 36. Housing 12 includes a main portion 14 that contains processing components to process information and a lid portion 16 rotationally coupled to main portion 14 by hinges 18. Lid portion 16 contains a display 20 interfaced with the processing components in main portion 14 to present the information as visual images. A motherboard 22 coupled in main portion 14 interfaces the processing components with integrated wirelines. A central processing unit system on chip (CPU) 24 executes instructions to process information in cooperation with a random access memory (RAM) 25 that stores the instructions and information. CPU 24 includes an embedded neural processing unit (NPU) that executes artificial intelligence (AI) instructions and an embedded graphics processing unit (GPU) that processes information to generate visual images. A battery 26 coupled in main portion 14 stores power that discharges to power the processing component operation and recharges from an external power source, such as an AC outlet. A speaker 28 interfaces with CPU 24 through motherboard 22 to generate audible sounds for presentation to an end user. A cooling fan 30 couples in main portion 14 near CPU 24 to generate a cooling airflow that rejects thermal energy from within housing 12, such as thermal energy generated as a byproduct of dissipation of power through the processing components. A discrete NPU 32 (dNPU) couples as a separate card to main portion 14 to interface through motherboard 22 with CPU 24 and provides AI processing resources with a removeable card structure described in greater detail below. A housing cover portion 34 couples to main portion 14 over the processing components and supports a touchpad 36 and keyboard 38 that accept end user inputs.

In the example embodiment, housing cover portion 34 couples to main portion 14 in a toolless manner with a keystone 40 that engages cover portion 34 at a rear side. Toolless assembly and disassembly of cover portion 34 simplifies access to the interior of housing main portion 14 to adapt the processing components with replacement of modular assemblies, such as dNPU 32. Self-alignment of signal interfaces between cover portion 34 and the processing components allow a drop and slide coupling structure with a quick connection of touchpad 36 and keyboard 38 signals to motherboard 22. Keystone 40 couples against cover portion 34 to hold the assembly in place and removes to release cover portion 34 to slide rearward to provide access to the housing interior. In the example embodiment, a removeable finger print reader (FPR) power key assembles in place with a preloaded plastic arm, as described in greater detail below. A pair of locking pull tabs that engage the keyboard in a desired position are readily lifted for removal. Keystone 40 captures keyboard 38 by inserting keying ribs into a slot at the tabs thereby holding the keyboard in position. The assembly and disassembly are toolless and do not use any screws so that an end user can quickly access the housing interior and adapt the processing components to a desired task, such as by adding, removing or swapping out a dNPU card. For example, housing cover portion 34 slides forward to engage housing main portion 12 and keystone 40 fits in the gap at the rear of cover portion 34 to prevent rearward sliding movement. Insertion of keystone 40 in the gap simultaneously secures keyboard 38 in place. Removal of keystone 40 allows keyboard 38 to slide out of cover portion 34 and cover portion 34 to slide out of main portion 14 in a reverse manner to the assembly. An example of a keystone that retains a housing in an assembled configuration may be found in U.S. patent application Ser. No. 18/081,098, filed Dec. 14, 2022, and incorporated herein as if fully set forth.

Figure 2:
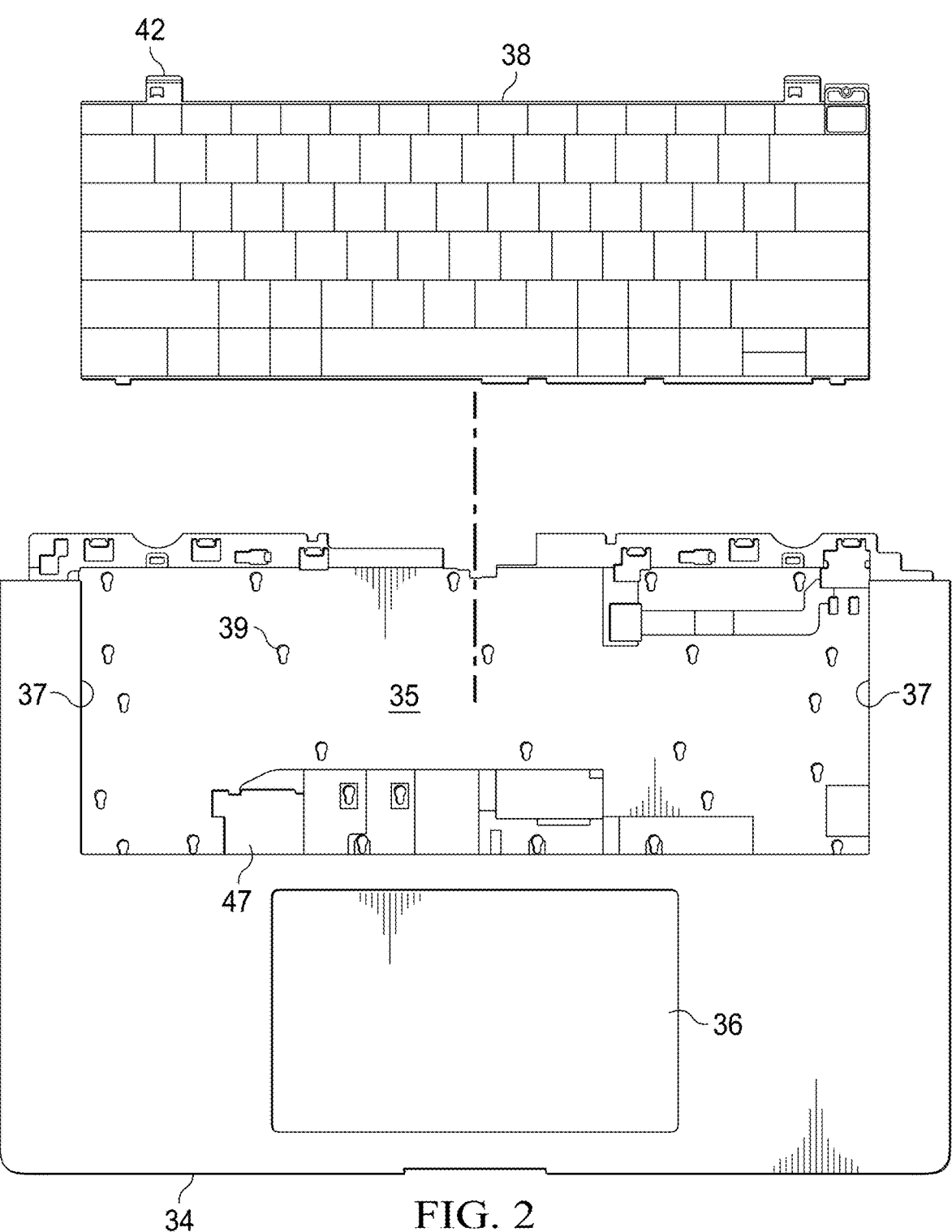
FIGS. 2, 2A, 2B, 2C and 2D depict a top view of a sliding assembly of a keyboard to a housing cover portion that is held in place by a keystone.
Figure 2A:
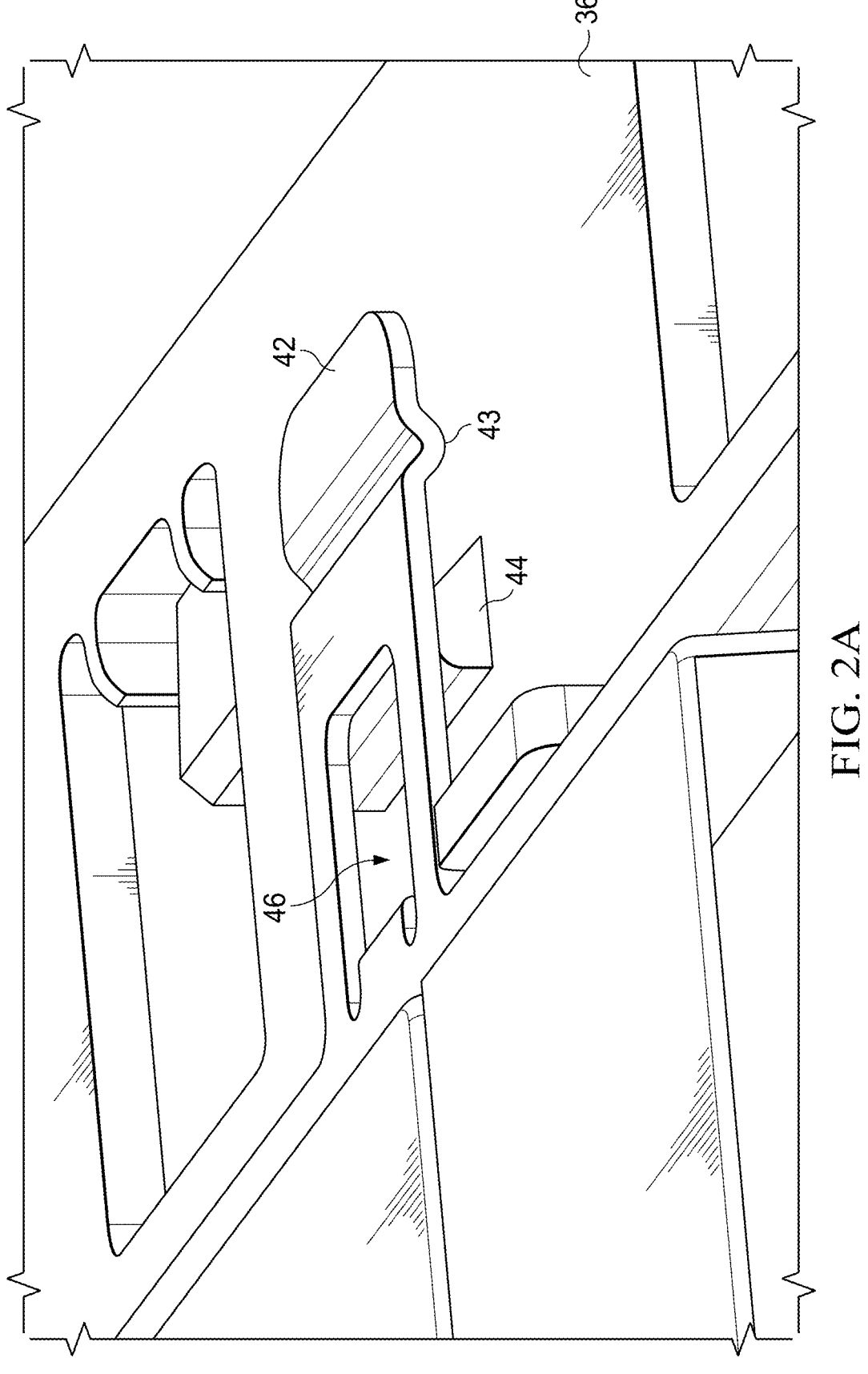
Figure 2B:
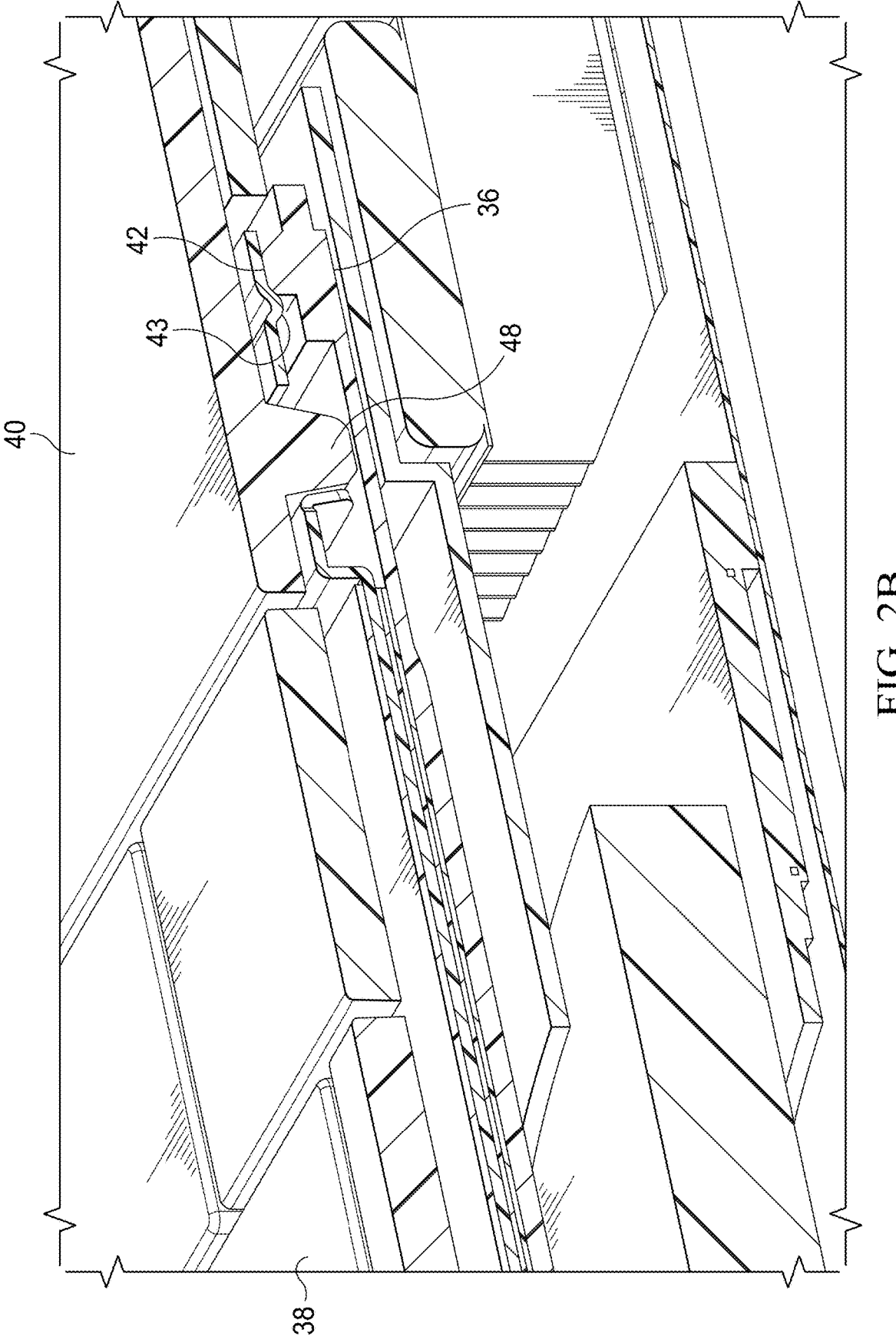
Figure 2C:
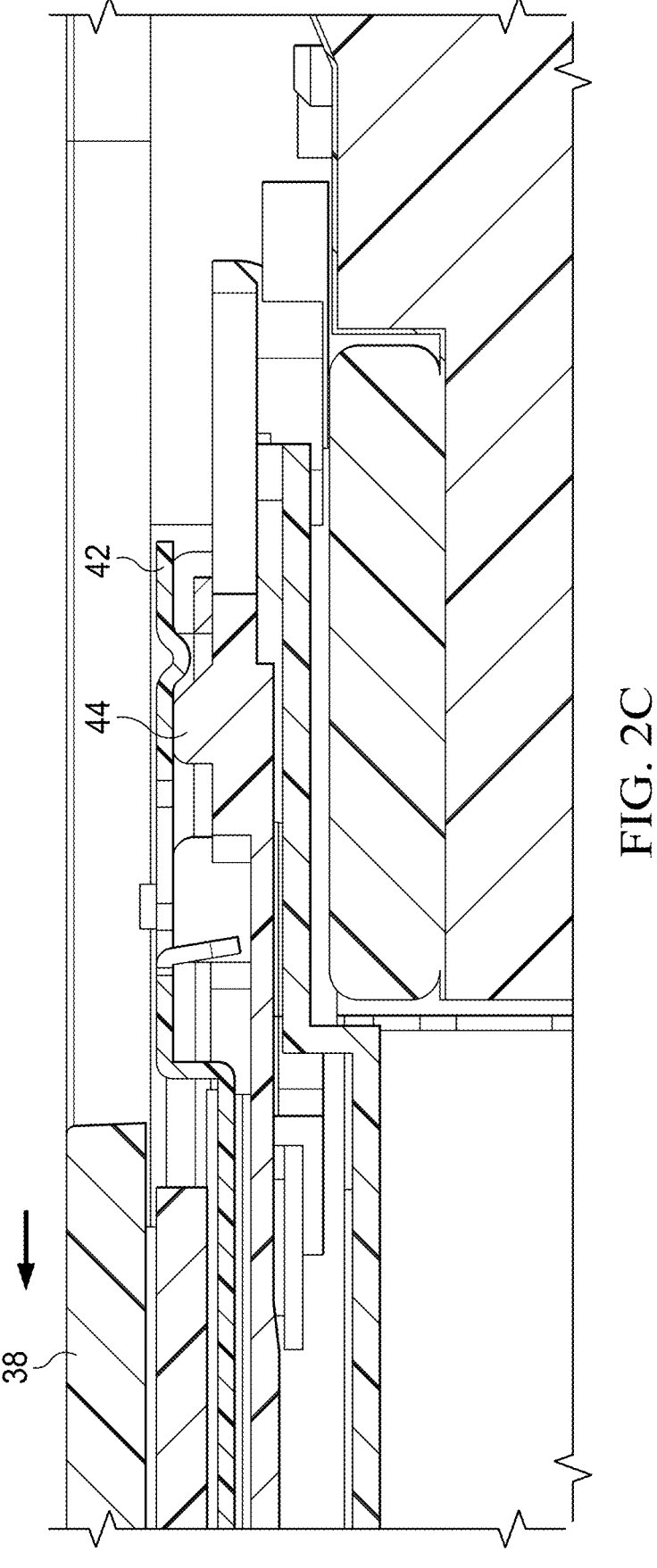
Figure 2D:
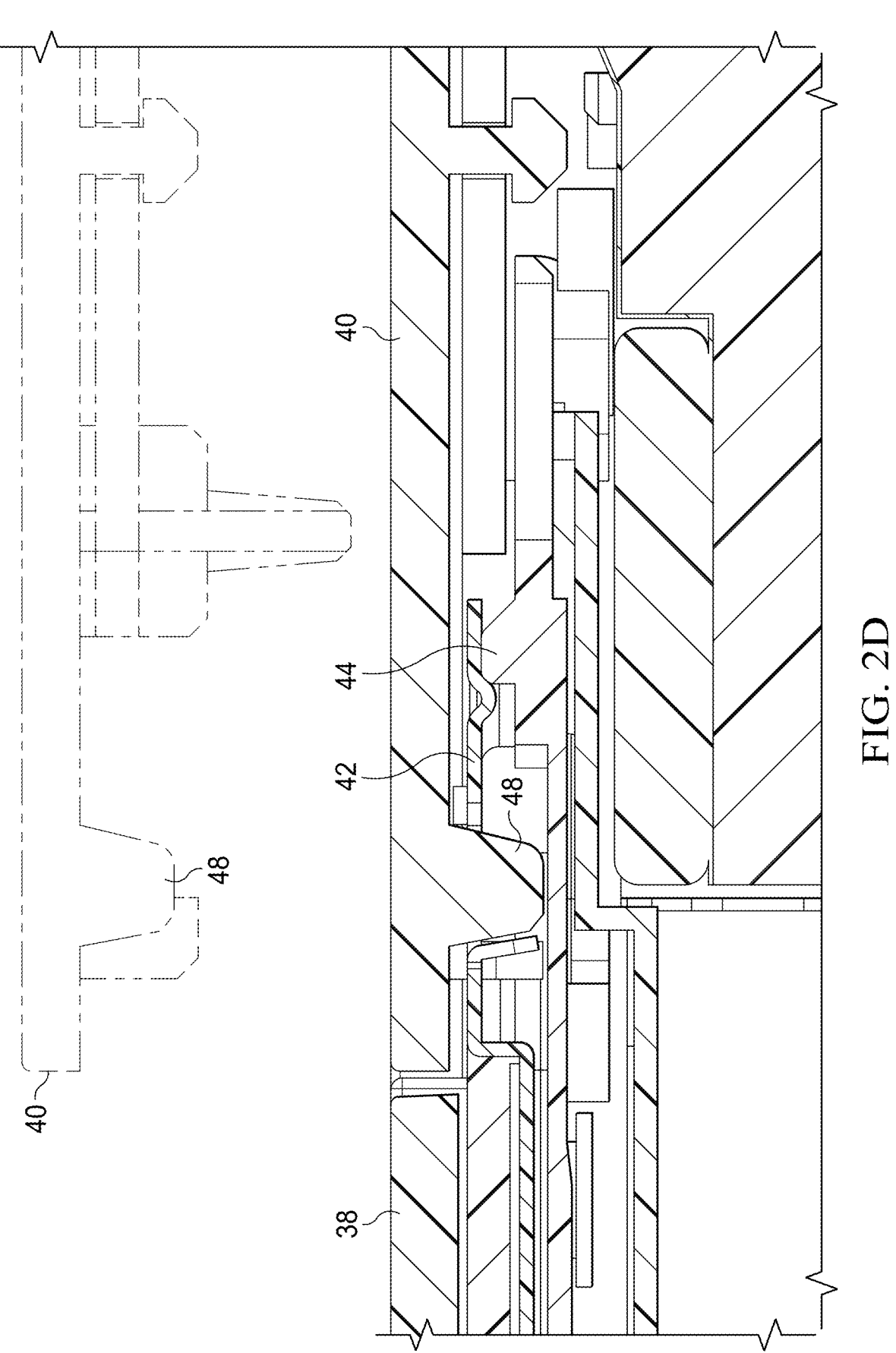

Referring now to FIGS. 2, 2A, 2B, 2C and 2D, a top view depicts sliding assembly of a keyboard 38 to a housing cover portion 34 that is held in place by a keystone 40. FIG. 2 depicts keyboard 38 aligned to insert into a guide area 35 formed as a slot in housing cover 34 from a rear side towards a touchpad 36 exposed at a front side. Keyboard 38 may couple in place with lip 37 formed on the edge of guide area 35 that engages the keyboard and/or with posts that extend down from keyboard 38 to engage in keyholes 39 formed in the housing cover portion. A tab 42 extends out the rear side of keyboard 38 to engage with a structure in housing cover 34 and thereby holds the keyboard in place. An opening 47 in the housing cover portion guide area proximate the touchpad provides a path through which contacts of the keyboard at the bottom side are exposed to contact connectors of the motherboard as explained in greater detail below. FIG. 2A depicts an upper perspective detailed view of tab 42 with keyboard 38 aligned to side into housing cover portion 34. Tab 42 is a resilient material, such as steel, stainless steel or a resilient plastic, and has an opening 46 and a detent 43 formed between the opening and the end of the tab. As keyboard 38 slides into place in the slot of housing cover portion 34, the detent 43 of tab 42 is pressed against a rib 44 to flex tab 42 upwards and engage on the inner side of rib 44. FIG. 2B depicts a side perspective sectional view of the detent of tab 42 engaged at the rib 44 to hold keyboard 38 in place at the slot of housing cover portion 34. Keystone 40 couples to housing cover portion 34 over tabs 42 and engages an insert 48 into the opening 46 of tab 42 to lock the keyboard in place. FIG. 2C depicts a side sectional view of keyboard 38 sliding along the housing cover portion 34 to press the detent of tab 42 against rib 44, thereby forcing the tab to flex upward and the detent 43 to engage resting on an inner side of rib 44. FIG. 2D depicts a side sectional view showing keystone 40 above the housing cover portion and also inserted onto the keyboard. An insertion member 48 extending down from keystone 40 into opening 46 fills opening 46 to fix the keyboard in place relative to both the housing cover portion and the keystone. Keystone 40 has other structures to couple to the housing and internal components and a snap at the rear side to couple to the housing. When keystone 40 is removed, keyboard 38 is freed to slide out of the slot of the housing cover portion, and the housing cover portion is freed for removal from the housing main portion.

Figure 3:
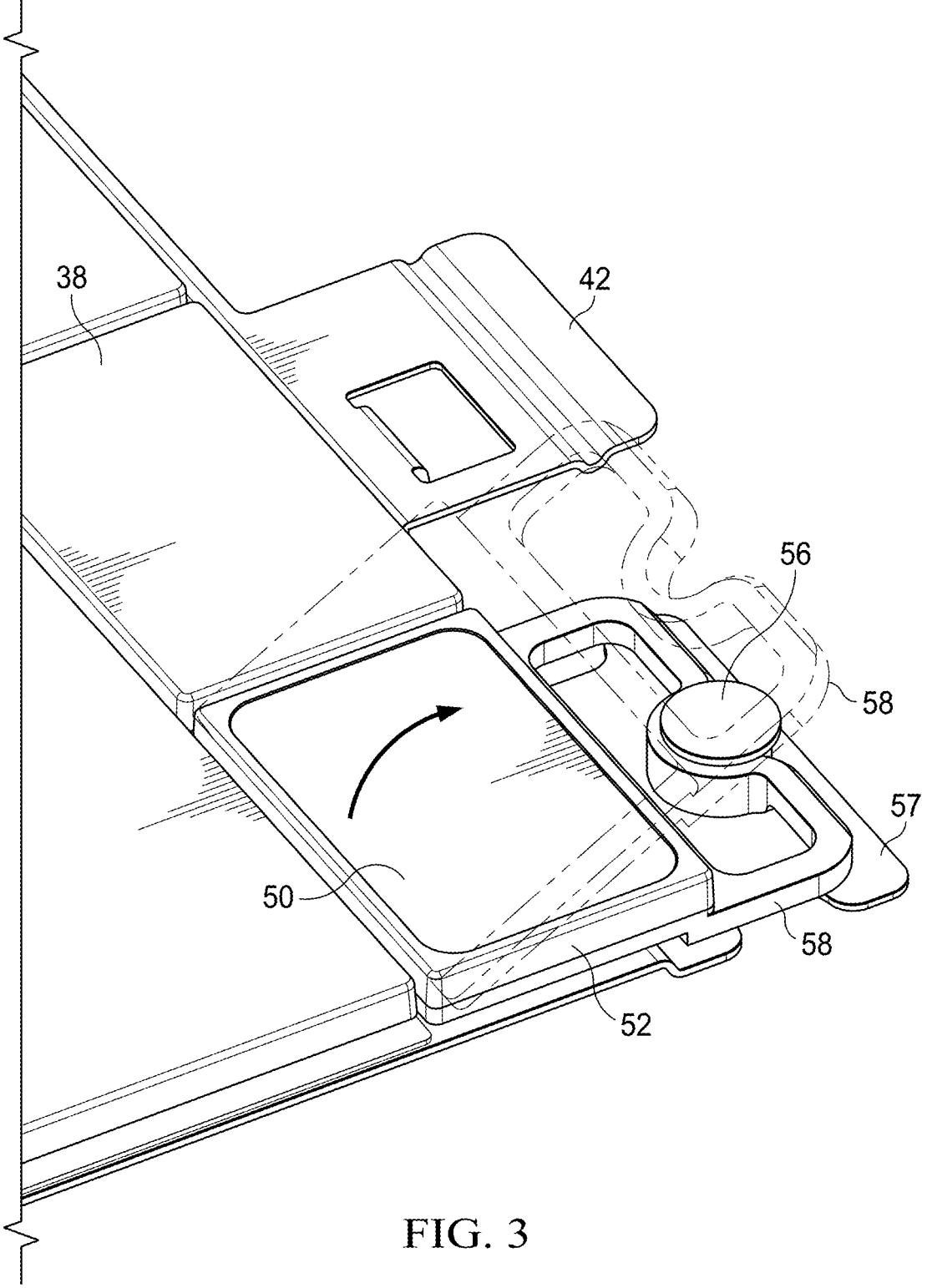
FIGS. 3, 3A and 3B depict a fingerprint reader (FPR) configured to couple to the keyboard.
Figure 3A:
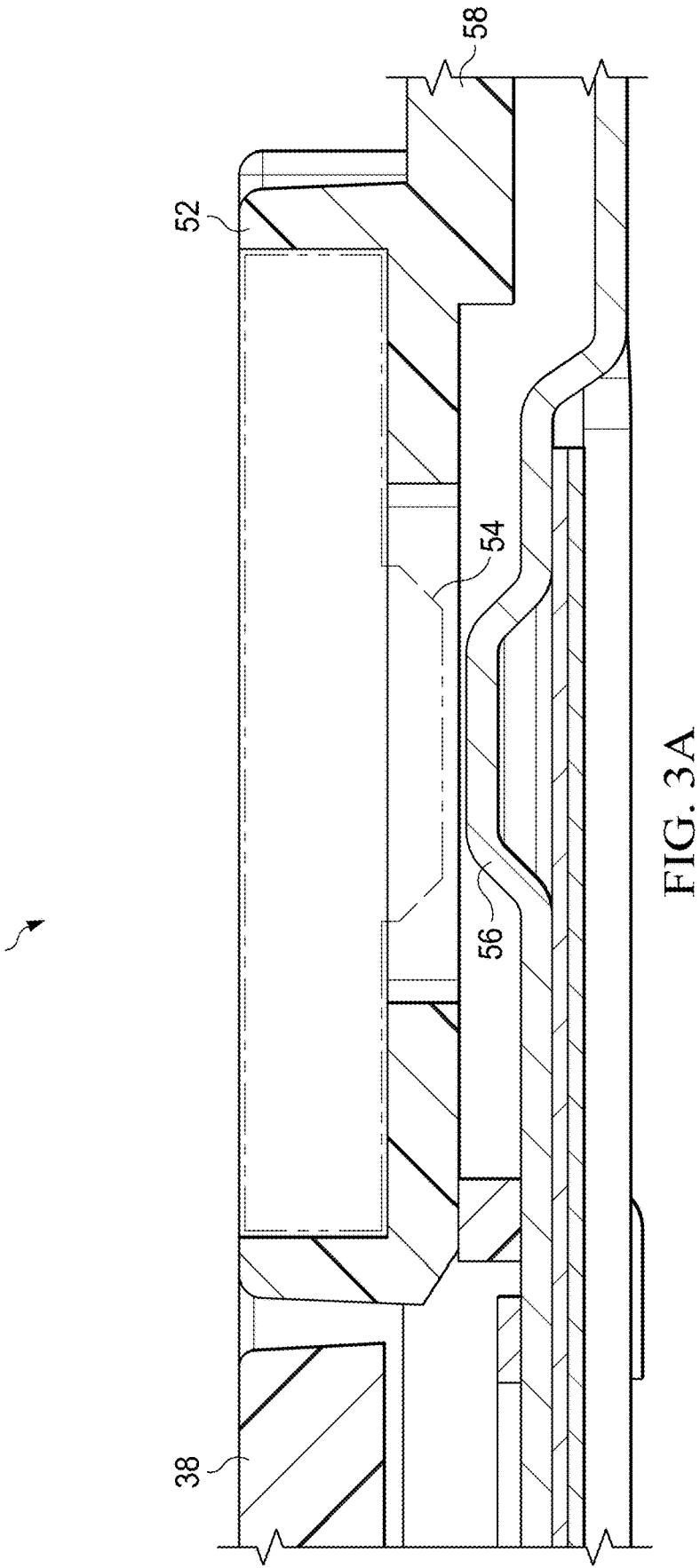
Figure 3B:
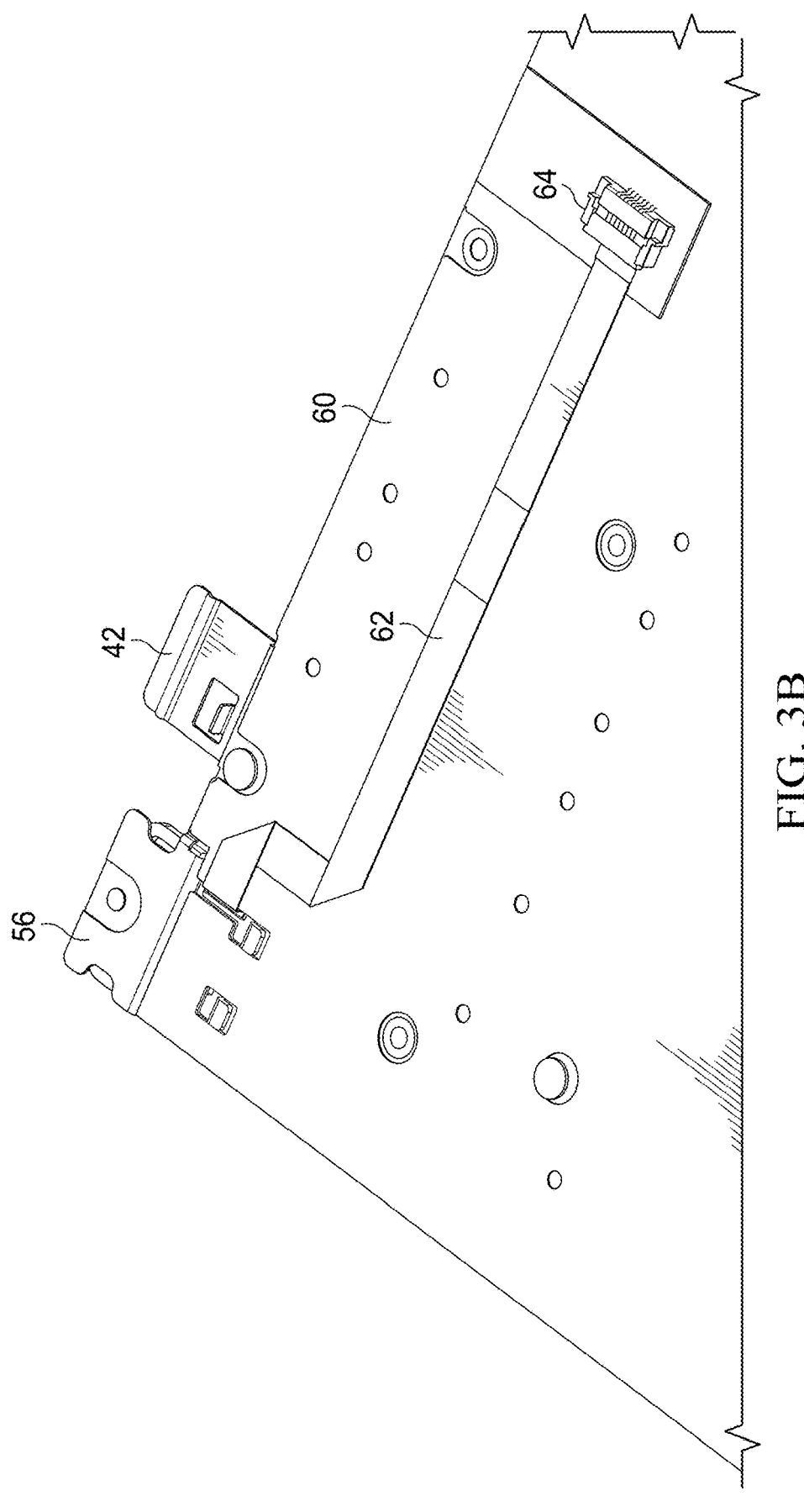

Referring now to FIGS. 3, 3A and 3B, a fingerprint reader (FPR) 50 is depicted configured to couple to keyboard 38. In the example embodiment, FPR 50 is a separate key that engages under keyboard 38 on an inner side and has a flexible member 58 on an opposite outer side that flexes to engage a pin 56 extending up from keyboard 38. Pin 56 is on an extension 57 of keyboard 38 to one side of tab 42 and is hidden by the keystone when the keystone couples over the top side of the housing cover portion. FPR 50 includes a fingerprint sensor that detects a fingerprint when a finger is placed on the upper surface of FPR 50. FIG. 3A depicts a side sectional view of FPR 50 coupled in place to keyboard 38 with a flexible member 58 holding a keycap 52 over top of the keyboard bracket. In one example embodiment, a press on FPR 50 depresses keycap 52 to turn on a power switch of the system located below the keycap, such as with a dome switch 54. Alternatively, FPR 50 turns on power to the system when an authorized user is detected. FIG. 3B depicts a bottom view of the housing cover portion when the keyboard and FPR are installed. A cable 62 couples to a bottom surface 60 of the keyboard and terminates at a cable connector 64. When bottom surface 60 couples over a motherboard, connector 64 aligns with a connector of the motherboard to interface FPR 50 and the power switch with components of the motherboard, such as an embedded controller that manages application of power to the system.

Figure 4:
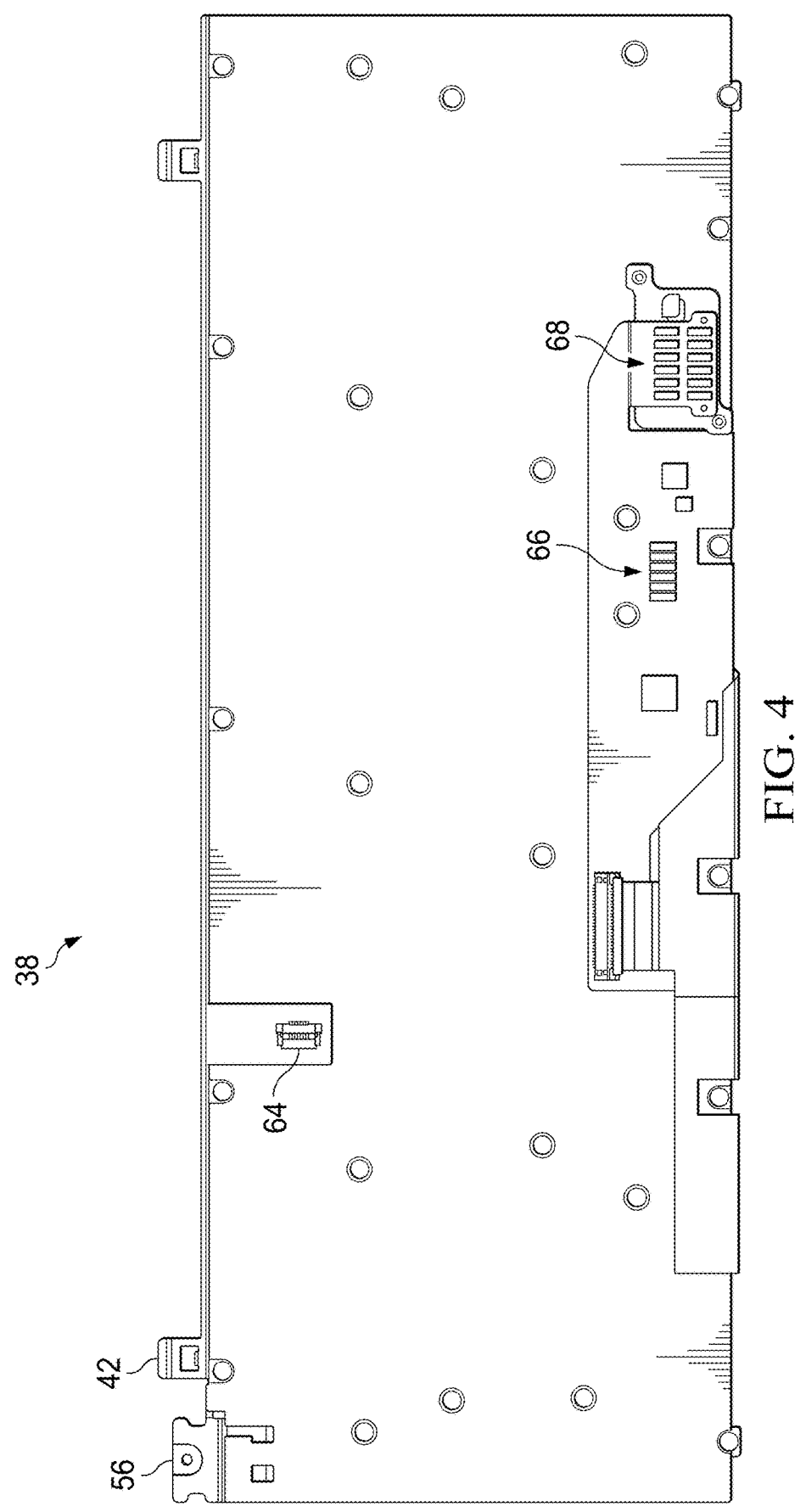
FIG. 4 depicts a bottom view of the keyboard arrangement of connectors to communicate with components below the keyboard, such as connectors of the motherboard.

Referring now to FIG. 4, a bottom view depicts the keyboard arrangement of connectors to communicate with components below the keyboard, such as connectors of the motherboard. The FPR couples as described above at pin 56 and communicates through connector 64, such as with an embedded controller or a trusted platform controller. Tabs 42 extend out the rear side of keyboard 38 as described above to couple the keyboard in place. A first set of touchpad contact pads 66 are exposed at a bottom side of a circuit board included in the keyboard and provide an interface between the keyboard and a touchpad included in the housing cover portion with six contact pads to support six contact pin connections, such as pogo pins extending up from the housing cover portion. A second set of contact pads 68 are exposed at the keyboard circuit board and aligned to connect with contact pins of the motherboard, such as pogo pins extending up from the motherboard. The two rows of six contact pads provide 12 pins to communicate both key and touchpad inputs to the motherboard, with the touchpad inputs communicated through the keyboard circuit board from the touchpad contact pads 66 to the motherboard contact pads 68, either directly or as part of a serial communication link like USB.

Figure 5:
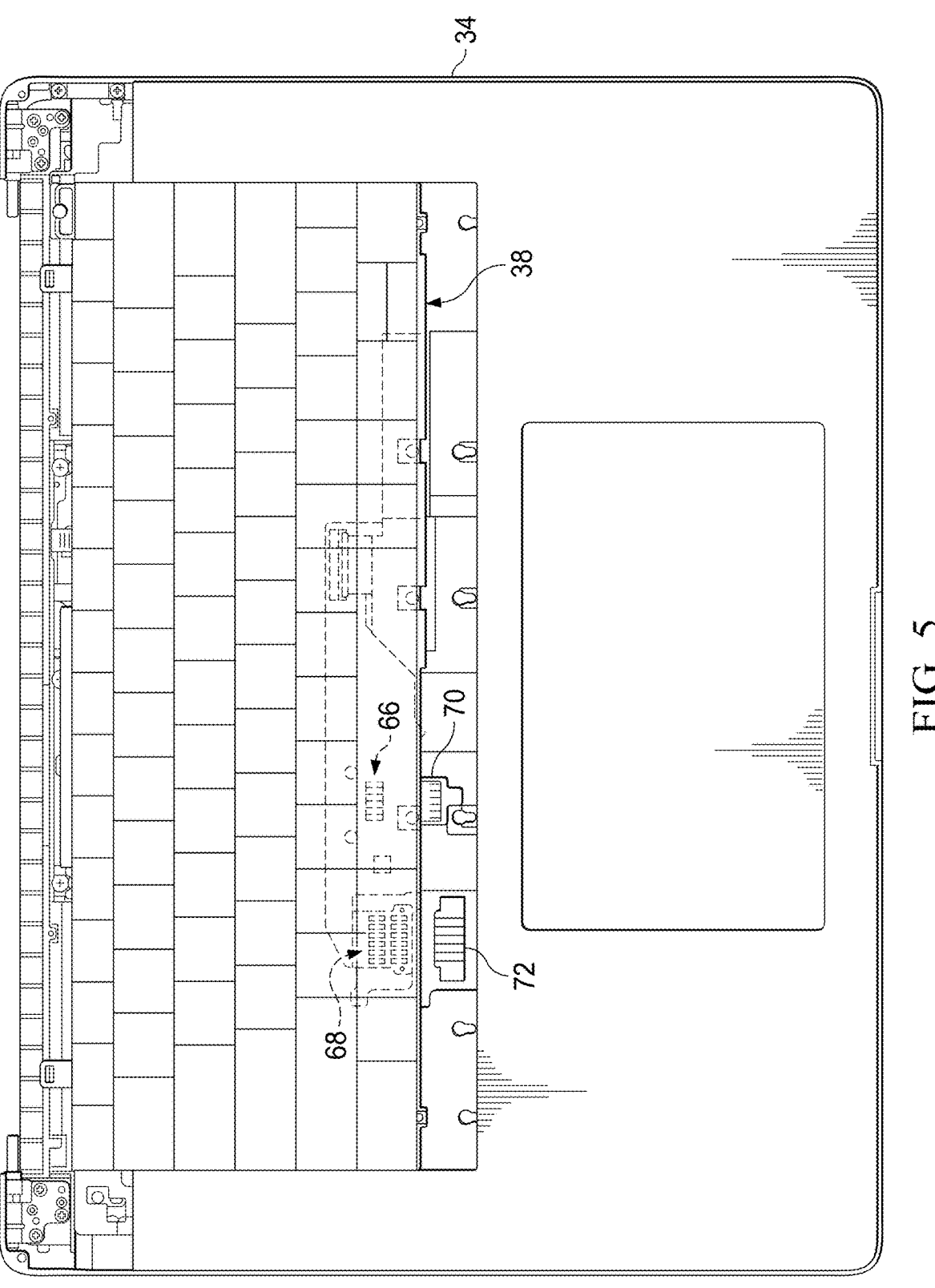
FIG. 5 depicts a top view of the keyboard having an interface between the keyboard, touchpad and motherboard interfaces with portions shown in a transparent view.

Referring now to FIG. 5, a top view of the keyboard depicts an interface between the keyboard, touchpad and motherboard interfaces with portions shown in a transparent view. In the example embodiment, keyboard 38 is slid into the slot of housing cover portion 34 as indicated by the arrows. Motherboard contact pads 68 slide into alignment with a motherboard connector 72 exposed at the motherboard upper surface. Similarly, touchpad contact pads 66 slide into alignment with touchpad connectors 70 extending by a flexible cable from the touchpad to an alignment position within the keyboard slot on housing cover portion 34. The sliding engagement ensures adequate communication contacts with a sliding motion that also couples the keyboard to the housing cover portion, such as with a lip and groove arrangement along the sides of the keyboard slot and keyboard.

Referring now to FIG. 6, a block diagram depicts an example embodiment of components in the keyboard circuit board to support communication between the keyboard, touchpad and motherboard. Motherboard connector 72 has a set of twelve spring biased connectors, such as pogo pins, with at least one of the pins supporting a USB serial link to communicate information. A keyboard controller 74 receives inputs from a key scan 76, such as key matrix included in a flexible membrane. Keyboard controller 74 interfaces with a USB hub 78 that communicates the key input values to the motherboard through contact pads to the motherboard connector 72. Touchpad connector 70 interfaces with a touch controller 80 of touchpad 36 to communicate touchpad inputs to USB hub 78 and on to the motherboard. Fingerprint reader 50 interfaces through connector 64 to communicate fingerprint inputs to USB hub 78 and also to a dedicated fingerprint reader wireline. Although the example embodiment uses a USB serial link to communicate inputs to the motherboard, in alternative embodiments other types of interfaces may be used, such as I2C.

Referring now to FIGS. 7 and 7A, an example embodiment depicts a speaker module 28 used as an internal keystone that holds a battery and motherboard assembly in a fixed position within housing main portion 14. In the example embodiment, four individual speakers are contained within a single speaker module 28 that couples in a defined location of housing main portion 14 when alignment openings 90 formed in the speaker module fit on alignment posts 92 extending up from the housing main portion. Spring contacts 96 included in speaker module 28 align with contact pads 98 of the housing main portion to communicate speaker signals to the speakers for presentation as audible sounds. When speaker module 28 inserts into the housing main portion, an inner side surface pushes against battery 26 to hold the battery and motherboard in place. Alignment posts 92 have a central opening into which a post extending down from the housing cover portion inserts to hold the assembly in place. FIG. 7 illustrates insertion of speaker module 28 into housing main portion 14 after the motherboard and battery are in position. FIG. 7A depicts the speaker module opening 90 with a post 92 inserted to hold the speaker module with a press against the battery and vibration isolation material retaining the speaker in place without translating speaker vibrations to the housing. Stack up tolerances are met by adjustments with the vibration isolation material, such as a rubber gasket, and a spring bias of the spring contacts 96 against the housing main portion.

Referring now to FIG. 8, a front side view depicts the speaker elements that assemble to form the speaker module. In the example embodiment, four speakers 94 are assembled in speaker module 28 to align at a front side of the housing main portion. Two spaced speaker module alignment openings 90 are placed to hold speaker module 28 in a keystone position associated with maintaining components of the information handling system in position once the speaker module is assembled. Spring contacts 96 exposed at the side surface press against a contact pad of the housing main portion to accept speaker signals that play at speakers 94. Spring contacts 96 have vertical alignment to press against contact pads on a vertical wall of the housing main portion for a vertical insertion that sets the battery placement when the speaker inserts into place.

Referring now to FIG. 9, an upper perspective view depicts speaker module 28 assembled in the housing main portion with the contact springs 96 pressing against the contact pads 98. In the example embodiment, contact pads 98 terminate with flat contacts at a flexible printed circuit that routes under the speaker module and battery from the motherboard to carry speaker signals. Spring fingers of the contact springs 98 bias outwards and against the contact pads to ensure good signal contact with a vertical insertion of the speaker module. Alignment opening 90 accepts alignment post 92 within a rubber grommet that isolates vibration transfer between the speaker module and the housing main portion.

Referring now to FIG. 10, a top view depicts contact of the speaker module against the battery to hold the battery in position within the housing main portion. Battery 26 has a bracket arm 99 that extends towards speaker module 28 and that has a central opening to accept a keystone member 101 extending up from speaker module 28. A foam/rubber grommet 100 around keystone member 101 interfaces against battery 26 to press against the battery and to dampen vibration associated with speaker audible output. In alternative embodiments, other structures may be used to press against battery 26 from speaker module 28 thereby holding battery 26 in position, such as springs extending from the speaker module or battery of a resilient plastic or other material.

Referring now to FIGS. 11A and 11B, side sectional views depict various embodiments of alignment post 92 insertion into a speaker module alignment opening 90. FIG. 11A depicts a pair of opposing vertical contacts 104 coupled in the speaker module 28 alignment opening 90 to center the alignment posts and help dampen vibration translation. FIG. 11B depicts a set of horizontal contacts 106 coupled in speaker module 28 alignment opening 90 to center the alignment post. Each of the horizontal contacts 106 has a circumference that surrounds alignment pin 92 and biases the alignment pin to a central location. Housing cover portion 34 couples over the alignment openings and alignment posts with a dampening material 102 that extends downward into the alignment opening to hold speaker module 28 in a vertical alignment position with downward pressure from dampening material 102. In one alternative embodiment, vertical contacts 104 and horizontal contacts 106 may interface through electrical contacts of the alignment post to communicate speaker signals to the speaker. For instance, a flexible printed circuit from the motherboard feeds into the alignment posts to communicate the audible signals to contacts 104 and/or 106, which in turn communicate with the four speakers of the speaker module.

Referring now to FIG. 12, an upper perspective exploded view depicts a cooling fan configured to insert into the housing main portion in a toolless manner. In the example embodiment, cooling fan 30 is shown with a bottom surface exposed and a gasket 110 on the bottom surface to seal the airflow path through the housing. Cooling fan 30 engages motherboard 22 on one side and rotates down over an alignment post formed in the housing main portion that has a spring latch to lock the cooling fan in place. Gasket 110 is compressed on the cooling fan bottom surface to seal airflow and ground the fan against the housing main portion, with the load of the spring latch against the gasket holding the cooling fan still against vibration and rattle related to cooling fan operation. The toolless single movement cooling fan installation and release with spring feature retention supports automation of assembly and disassembly without screws or similar permanent retention devices.

In the example embodiment, tabs 114 and 116 extending out from the sides of cooling fan 30 align with slots 120 and 122 defined at the motherboard 22 so that cooling fan 30 rotates from the upside down orientation to engage in place with gasket 110 pressed against the bottom of housing main portion 14. In the installed position, the front side of cooling fan 30 exhausts into cooling fins of a heat pipe 124 that transfers excess thermal energy from the system CPU to the cooling fan exhaust. A set of electrical contacts 118 are exposed at motherboard 22 to interface with cooling fan 30 electrical contacts 112 that power and control cooling fan operation. A tab 126 on the opposite side of cooling fan 30 from the electrical contacts 112 provides a reference location at which detection by the motherboard indicates proper installation of the cooling fan to enable cooling fan operation.

Referring now to FIG. 13, a rotating installation is depicted of cooling fan 30 to interface with the motherboard. As cooling fan 30 rotates to align the gasket with the housing main portion, the tabs 114 and 116 insert into the motherboard slots with a lateral motion as the cooling fan electrical contacts align with motherboard electrical contacts 118. A ledge extending out the front side of cooling fan 30 is placed over heat pipe 124 as cooling fan 30 rotates downward into position. Tab 126 aligns with a sensor on motherboard 22 so that cooling fan 30 provides an indication of full installation when tab 126 contracts the motherboard sensor, such as by closing an electric contact. A latch 128 of cooling fan 30 is aligned with a pin extending up from the housing main portion to secure the cooling fan in place with a downward bias.

Referring now to FIG. 14, a top view depicts cooling fan 30 fully installed at the motherboard with the spring latch 128 holding the cooling fan in place with a compression force. Cooling fan 30 presses flat against the housing main portion bottom surface with a pin extending up from the bottom surface and into a spring latch 128 engaging with the spring latch to compress the cooling fan against the gasket. Full installation of cooling fan 30 is detected by contact of tab 126 against a motherboard switch, such as a latch or dome switch that provides a contact indication to a GPIO pin of the system embedded controller. In one example embodiment, spring latch 128 is a press and release latch that disengages on a downward push at the cooling fan. The result is a screwless cooling fan assembly with self-alignment and stable compression for improved cooling airflow. Automated disassembly is offered with a press and release spring latch that raises cooling fan 30 upwards on release to be accessible to robotic manipulation.

Referring now to FIG. 15, a detailed upper perspective view depicts an example embodiment of the cooling fan latch and insertion detection sensor. Latch pin 130 couples to the housing main portion bottom surface and extends upward aligned to insert into spring latch 128. Contacts 134 are exposed at an upper surface of the motherboard and interface to complete an insertion detection circuit with a cooling fan protrusion 132 completes a circuit across the contacts.

Referring now to FIG. 16, an upper perspective view depicts a discrete NPU (dNPU) 32 configured to insert into a slot of housing main portion 14 and having a thermal heat pipe assembly 140 that supports a millimeter (mm) wave antenna. In the example embodiment, dNPU 32 has an edge connector 142 that inserts into an edge connector socket 144, such as an M.2 edge connector and socket. A spring element 146 is placed under dNPU 32 to bias the dNPU card up and out of the slot while a dNPU latch 148 holds dNPU 32 in place once assembled. For example, dNPU 32 is an AI-100 card with plural AI processing resource cores that thermally couples to the heat pipe assembly 140, which accepts excess thermal energy for rejection exterior the housing main portion, such as with cooling fan airflow by a cooling fan 30. Between dNPU latch 148 and the housing main portion vent is an antenna assembly 154 having a mm Wave antenna circuit 152. A thermal pad 150 extending from one side of antenna assembly 154 thermally interfaces with the mmWave antenna circuit 152 and with heat pipe assembly 140 to aid in removal of excess thermal energy from the antenna circuit.

An advantage of mmWave antenna circuit 152 is increased communication throughput to reduce latency when AI processing resources locally employ external AI resources. However, mmWave antenna circuits tend to generate substantial thermal energy as a byproduct of operations that is typically rejected external the housing by active cooling, such as operation of a cooling fan. Thermal pad 150 thermally interfaces with mmWave antenna circuits to draw thermal energy towards heat pipe assembly 140 to conduct the thermal energy through heat pipe assembly 140 for rejection from the housing main portion. In one example embodiment, the air intake for cooling fan 30 is through antenna assembly 154 at a vent opening to the housing exterior and passed by the mmWave antenna circuit and into the housing before being exhausted by cooling fins of heat pipe assembly 140.

Referring now to FIG. 17, a side perspective view depicts the antenna circuit 152 prepared to insert into the housing main portion. Thermal pad 150 has a thermally conductive material, such as graphene or copper, that thermally interfaces with processing components of antenna circuit 152. The main body of antenna assembly 154 routes air from the housing exterior at least in part across the antenna circuit to transfer thermal energy from the antenna circuit.

Referring now to FIGS. 18 and 18A, the antenna assembly 154 is depicted coupled into place in the housing main portion to direct air flow from an intake vent through the antenna assembly and into the housing main portion. Heat pipe assembly 140 is shown as a transparent form to illustrate the interface of the conductive heat pipe material with thermal pad 150. Antenna assembly 154 couples antenna circuit 152 in place and guides cooling airflow over the mmWave circuits. The cooling airflow pulled by cooling fan 30 passes over dNPU 32 and through cooling fins of heat pipe assembly 140. FIG. 18A depicts an example embodiment of airflow guided from outside housing main portion 14 through vents with a split flow that has an upper pathway across the top surface of dNPU 32 and a lower pathway through antenna assembly 154 and across antenna circuit 152. In one example embodiment, antenna assembly 154 is a MIMO antenna configuration having first and second antennas that communicate in a coordinated manner and the airflow through antenna assembly 154 is through a channel formed between the first and second antennas. Cooling airflow drawn by a cooling fan through the channel may be adjusted to maintain a thermal constraint for temperatures measure in the channel. Alternatively, cooling airflow of the cooling fan may be adjusted to maintain a temperature constraint of temperatures measured at the thermal pad. For instance, temperatures measured at the thermal pad and in the antenna assembly channel are communicated to an embedded controller that manages cooling fan speed with instructions stored in non-transitory memory on the embedded controller or similar processing resource.

Referring now to FIGS. 19, 19A and 19B, dNPU 32 is depicted installed in the dNPU slot and held in position by dNPU latch 148. FIG. 19 depicts a top view having dNPU latch 148 biased against dNPU 32 to hold the M.2 edge connector in the M.2 edge slot. As indicated by arrow 160, a press at the dNPU latch 148 away from the dNPU overcomes the bias to release the dNPU and allow the underlying spring described above to lift dNPU 32 out of the slot. FIG. 19A depicts a side sectional view having dNPU latch 148 biasing away from dNPU 32 to release the dNPU for removal from the slot. FIG. 19B depicts dNPU 32 raised along the direction of arrow 162 when dNPU latch 148 has released the card so that the edge connector may be pulled out of the edge connector slot along arrow 160. dNPU latch 148 is a plastic molded part that includes preloaded arms to self-lock a dNPU in the slot along a linear rail movement axis. The unibody plastic latch part has a snap on interface to couple to the housing main portion at a stationary base in a latched position so that a press down by a dNPU card displaces the latch to accept the dNPU in the slot with a self-locking installation. Dual latching locations at notched areas of the base provide a stable latch and release while the unibody rail construction constrains latch movement. A sensor detects activation of the latch to monitor dNPU accesses with CMOS battery power for improved security. For instance, spring finger contacts within the latch close a circuit upon latch actuation to detect latch actuation and store the actuation as an event tracked by CMOS clock time.

Referring now to FIGS. 20A and 20B, an upper perspective view depicts the dNPU latch 148 in a transparent manner at the dNPU slot and separate from the dNPU slot. FIG. 20A depicts dNPU latch 148 as a transparent part that couples to the housing main portion at a base 166 with a rear side against antenna assembly 154 and antenna circuit 152. Base 166 has a sensor contact 170 exposed at a base wall 168 and interfaced with a system embedded controller or other processing resource through a flexible printed cable 172. When dNPU latch 148 is pulled towards antenna assembly 154, a contact of the dNPU latch handle closes against sensor 170 to close a circuit and indicate a dNPU latch actuation. FIG. 20B depicts dNPU latch 148 separate from the housing main portion with a sensor 170 exposed at the handle that pulls to release the dNPU resting on a base 174. Resilient flexible material of arms 178 flexes when pulled in the direction of the arrows over arms 176 so that a dNPU resting on base 174 is released from latches that engage the dNPU at base 174. Stop walls 180 fit around a mounting structure of the housing main portion to hold dNPU latch 148 in place and to define a maximum latch movement when pulled in the direction of the arrows.

Referring now to FIGS. 21 and 21A, an upper perspective view depicts an alternative dNPU latch actuation sensor to detect dNPU removal. FIG. 21 depicts dNPU 32 raised above housing main portion 12 to separate edge connector 142 from edge connector socket 144. Spring 146 is a bent metal piece that biases dNPU 32 out of the slot when dNPU latch 148 releases the dNPU card by a pull of the handle towards the housing main portion side wall. A flexible printed circuit 182 has a conductive pad aligned with spring 146 to detect when dNPU 32 is raised away from the housing main portion base surface. FIG. 21A depicts a detailed view of flexible printed circuit 182 that has a conductive pad 186 exposed under each spring 146 to detect when installation of a dNPU compresses the spring. In one embodiment, flexible printed circuit 182 communicates detection of a dNPU to an embedded controller or similar processing component and also interface the antenna circuit with the system motherboard. Alternatively, a separate cable 184 may support communication between the system motherboard and antenna circuit.

Referring now to FIG. 22, a circuit block diagram depicts an example circuit for detection of dNPU accesses at a dNPU slot. In the example embodiment, an embedded controller 190 executes instructions stored in non-transitory memory to monitor a logic latch 192 interfaced through a GPIO. Current source Vreg_coin 196 is provided from a CMOS battery to monitor dNPU accesses when the information handling system is powered down. An NPU latch 194, such as in the dNPU latch handle or at the based of the dNPU slot spring, closes or opens a circuit based upon when the dNPU is installed or released. Logic latch 192 detects a change in condition of NPU latch 194 and issues a signal to embedded controller 190 at a GPIO to wake and execute firmware instructions that store the dNPU access time, such as by reference to a CMOS clock. In one embodiment, a dNPU event is stored in logic latch 192 until the embedded controller retrieves the event and resets the latch.

Referring now to FIG. 23, a block diagram depicts a system that manages AI instruction execution by selected of plural AI processing resources. In the example embodiment, a central processing unit system on chip (CPU) 24 has plural CPU cores 228 that cooperate to execute instructions under management of an operating system 236, such as WINDOWS. CPU cores 228 cooperate with RAM 25 to execute instructions that process information to include the operating system and applications like a videoconferencing application 244. Typical application instruction sets executed on CPU cores 228 compute information in a conventional manner with algorithms that perform specific tasks using predefined instructions having defined outcomes with pre-programmed logic and results based on expected input value types. CPUs execute instructions in a serial manner, versus concurrent processing performed by NPUs to execute AI instructions. In contrast, artificial intelligence instructions seek to mimic human intelligence based on learning performed from a dataset that generates an AI model. AI models seek to improve performance through experience and an iterative prediction or decision making process, such as based on patterns found by a model in a large dataset. Narrow AI is typically modeled to achieve specific tasks from a more narrow dataset relevant to the specific tasks. General AI seeks to mimic human intelligence with a model built on a large and wide ranging dataset. Algorithms analyze inputs to make decisions based on a variety of models, such as decision trees, neural networks and support vector machines.

In the example embodiment, a variety of AI processing resources are available to execute AI instructions that output AI results from AI models. CPU 24 includes one or more embedded NPU 230 cores that are optimized to execute AI instructions within the CPU, such as with a nominal 45 TOPS of performance. In addition, CPU 24 includes one or more embedded graphical processing unit (GPU) 232 cores that are optimized to process information to generate visual images, such as pixel values. Although embedded GPUs optimize to generate visual images, the concurrent processing performed is adaptable to perform AI instructions although at a lower rate than is available to an embedded NPU. A discrete GPU 220 is a separate card assembly that interfaces with the CPU through a bus, such as a PCIe bus, and that typically has improved graphics processing compared to an embedded GPU. Like embedded GPUs, dGPUs can run AI instructions instead of or in addition to performing graphics processing. As described above, a discrete NPU (dNPU) 32 is a dedicated card having NPU processing cores optimized to execute AI instructions with improved performance, such as 200 TOPS. The dNPU latch described above and the toolless cover access provides a ready swap of the dNPU installed in a portable information handling system to adapt the system for various tasks. When the available AI processing resources fail to meet an end user's needs, external AI resources are also typically available, such as by interfacing through a network interface controller (WNIC) 222 with a cloud 224 having server information handling systems with dedicated NPUs 32.

The modular portable information handling system described above selectively includes advanced AI capabilities with assembly and disassembly of the housing to adapt the system as desired by an end user. Facilitation of the integration of AI capabilities enhances performance, personalizes a system for desired end user objectives and increases real-time processing with reduced reliance on external AI processing resources. A difficulty that can arise with the increased flexibility is that total performance may optimize with different processing allocations depending upon how a system is configured at different times with embedded, discrete and nonlocal AI processing resources. To manage assignment of AI processing resources, an AI model prioritizer 234 stored in non-transitory memory, such as flash memory of an SSD 236, executes on embedded controller 190 and/or CPU 24 to select AI processing resources for AI tasks based upon available resources and desired processing goals, such as power efficiency and result latency.

In some situations, plural AI models execute continuously or simultaneously at least on a transient basis. AI model prioritizer 234 optimizes AI model computations to maximize performance in a manner that minimizes power consumption while meeting end user latency requirements. Running multiple models on a single NPU can result in significant performance and latency impacts that will reduce the end user experience. As an example, overloading an NPU can result in movement of AI models into and out of system and NPU memory so that delays are introduced to manage system overhead. In contrast, leveraging less power AI processing resources for certain models can provide an overall improvement in system performance where system overhead delays are reduced. The assignment of AI tasks to AI processing resources is based upon estimates of model power use, latency, loads, length, depth and other factors for each AI processing resource. In one example embodiment, an AI model trained on the system based on historical hardware demands and model results is run in real time to perform AI task assignments to AI processing resources. In one example embodiment, the AI model priortizer starts by assessing the current AI task requirements, such as the model/parameter size (i.e., memory), the model depth (vertical), the model depth (horizontal) and any RAG requirements. Next, the AI model prioritizer assesses the current AI task latency requirements, such as tokens per second, audio, video, chatbot and telemetry. Once the task requirements and latency requirements are determined, the AI model prioritizer maps AI tasks to available AI processing resources for execution, such as to dNPUs, embedded NPUs, dGPUs, embedded GPUs, CPUs and cloud NPU resources. For instance, the highest priority tasks are mapped to AI resources in descending order based on a calculated weighted priority.

15

For AI models and tasks [a0, a1, a2, . . . aN]

Calculate Priority Weighting [P(a0), P(a1), P(a2), . . . . P(aN)]

$$P(a0) = A*a0 + B*a0 + C*a0 + D*a0 + E*a0$$

$$P(a1) = A*a1 + B*a1 + C*a1 + D*a1 + E*a1$$

$$P(aN) = A*aN + B*aN + C*aN + D*aN + E*aN$$

Map AI tasks to available AI compute nodes [R] (dNPU, iNPU, dGPU, iGPU, CPU, etc.)

$$R(0) = P(0)$$

$$R(1) = P(1)$$

$$R(N) = P(N)$$

In some situations, a single AI processing resource may be used to support multiple AI models so that mapping of AI tasks to AI resources is not necessarily a one-to-one process. For instance, R(0) and R(x) can be the same resource until the resource is fully utilized.

In one example embodiment, AI model prioritizer 234 manages assignment of AI processing resources to enhance an end user experience when participating in a videoconference by executing a videoconference application 244 stored in non-transitory memory of an SSD to run on CPU 24. An end user initiates a videoconference call that selectively uses plural AI models. The videoconference application 244 has an audio component 246 that records audio with a microphone and plays audio with a speaker. A video component records video with a camera and plays video at a display enhanced by a graphics processing unit. A notes component 250 tracks content presented during a videoconference, such as presentations, notes and scheduled follow up meetings. The videoconference application 244 executes over an operating system 236 that manages operating conditions by monitoring system telemetry 238, offers AI assistance on a system level with an AI co-pilot 240 and accesses hardware components with hardware drivers 242, such as cameras, microphones, speakers and displays. Each of the operating system and videoconference applications include AI models that may or may not be used during a video conference. AI model prioritizer 234 distributes instructions to CPU 24, embedded controller 190 and various AI processing resources as determined on a real time basis.

During the videoconference, an audio AI model of audio component 246 performs noise cancellation, 3D audio and audio quality management. A video AI model of video component 248 optimizes video quality, tracks objects and faces in video content and provides real time augmented information to supplement the video content. At the same time, an AI agent of the notes component compiles a real time set of meeting notes and action items. Other AI models may execute asynchronously as part of the operating system general housekeeping, such as an AI model in the telemetry component. The telemetry information includes processing and memory utilization data that in turn feeds an AI model of AI model prioritizer 234, which monitors AI efficiency and latency to help optimize assignments of AI models to AI processing resources. As videoconference application functions become active and consume varying amounts of available AI processing resources, AI model prioritizer assigns AI models to AI processing resources to optimize efficiency by reducing power consumption and to optimize end user experience by meeting processing latency goals. For instance, low latency requirements associated with keeping notes might allow transient surges in memory use as other AI models reduce their memory and processing use. Higher latency requirements, such as real time audio and video optimization, may have continuing memory demands with more frequent but less in depth processing so that lower capacity processing resources are used, such as an embedded NPU or embedded GPU within the CPU system on chip. Adjustment of assignments of AI processing resources on a real time basis is performed as the model task requirements and latency requirements generate different calculated weighted priorities. AI tasks are mapped to the AI compute nodes and managed as processing and memory demands change.

In one alternative embodiment, AI model prioritizer 234 considers additional factors when assigning AI models to AI resources, such as privacy and security. For example, AI model assignment to AI processing resources is based on the type of AI model, the inputs to the AI model and the outputs of the AI model, with assignments adjusted in part by end user preferences for output security and privacy as reflected by configuration settings. In particular, enterprises and organizations build AI models based upon confidential data, including intellectual property and customer data. The nature of the AI models and the output can involve sensitive enterprise information and competitive advantages. Narrow AI models trained with proprietary, secure or private user data and models that use Retrieval Augmented Generation (RAG) that include proprietary data have different types of security issues compared with general AI models. To address these security concerns, AI model prioritizer 190 rates AI models based upon the proprietary nature of the data used to create the AI models, the inputs to the AI model and the outputs of the AI model, and direct more sensitive AI model execution to local and secure AI processing resources. In some instances, local AI processing resources are also ranked by security so that, for instance, an embedded NPU might be given priority over a dNPU due to tighter security a trusted environment of a CPU. In other instances, cloud 224 may be used to access remote dNPUs of a server information handling system 226 for less secure AI models to preserve local AI processing resources for more sensitive AI models, even where use of the remote AI processing resources decrease efficiency and latency.

In one example embodiment, security and privacy levels are managed by assessing current AI task security and privacy requirements. These requirements may be assigned in a configurable manner or may be automatically generated with an AI model that monitors other AI models to assign security and privacy ratings, such as by evaluating the sensitivity of model data, inputs and outputs. Once the AI mode task security and privacy requirements are evaluated, the currently available AI resources are determined along with each available AI resource's security and privacy capabilities. The AI tasks are then mapped and assigned to the available AI processing resources to achieve at least a minimum privacy and security level while still achieving efficiency and latency goals. As an example, privacy and security levels are greatest in local integrated AI processing resources, such as embedded NPU and GPU resources, decrease slightly in local discrete AI processing resources, such as dNPU and dGPU, and then decrease to varying degrees with remote AI processing resources. In one example embodiment, the privacy and security of AI models are evaluated based on seven layers of information technology security: mission critical assets, data security, application security, endpoint security, network security, perimeter security and human layer security.

In another alternative embodiment, in addition to efficiency, latency and security, AI model prioritizer 234 prioritizes AI loads based length and depth of AI models. AI models are evaluated, in summary, to determine the parallel operations needed by the AI model and that evaluation is applied to assign the AI model to AI processing resources. A variety of different AI model types may be executed at AI processing resources including linear regression, logistic regression, decision trees, random forests, neural networks, LLMs, deep learning, and machine learning. Each type of model has a different architecture and compute requirements for optimal operation that can be estimated by the length of the AI model and the depth of the AI model. The length and depth may be stored as a configuration factor when the AI model is installed at the information handling system or may be determined in real time as the AI model is initiated. Once the AI model length and depth are determined, the available AI processing resources are ranked from most to least capable of running the AI model and inappropriate AI processing resources are eliminated from selection. The AI processing resource is then mapped to the ordered rank based upon efficiency, latency and security objectives. As AI models are activated and deactivated, the length and depth values are referenced to identify those Referring now to FIG. 24, a flow diagram depicts a process for managing AI instruction execution by selected of plural AI processing resources. The process starts at step 200 by identifying AI processing resources, such as embedded NPUs and GPUs, discrete NPUs and GPUs, and nonlocal resources accessible through a network interface. At step 202 the AI models are identified along with the length and depth of each AI model. The AI models include AI models that are active and likely to be activated, such as those that maintain information in memory. At step 204, the AI model inputs and outputs are identified along with security and privacy settings for each. At step 206 an AI model priority is generated based upon power and latency goals for each, such as by a list of weighted priorities. At step 208 AI model priority is generated based upon the model length and depth, such by identifying optimal, sufficient and incompatible AI processing resources for each AI model. At step 210 AI model priority is generated based upon input and output security to include security for the data used to train each AI model. Once priorities are established for efficiency, latency, security, length and depth, at step 212 the AI models are assigned to the AI processing resources to balance the various factors and achieve AI model operation locally in the portable information handling system that offers an improved end user experience.

Referring now to FIG. 25, a flow diagram depicts a process for allocating AI task to AI processing resources based on AI models, AI priorities and AI latency. The process starts at step 252 by accessing current AI task requirements, such as power optimization and security. At step 254 the current AI model latency requirements are accessed. From the task and latency requirements at step 256 a weighted priority is calculated for the AI tasks. Once the AI tasks are prioritized, the process continues to step 258 to map the AI tasks to AI processing resources. At step 260 the hardware demands associated with the AI tasks are monitored and stored. At step 262 the AI models are graded to compare the expected performance against the actual performance as measured by processing resource and memory use. The process then returns to step 258 to map the AI tasks to the AI processing resources based upon the updated performance, such as by moving AI models to different AI resources where performance improvements warrant the moves.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a main portion rotationally coupled to a lid portion;
a motherboard coupled in the main portion;
a processor coupled to the motherboard and operable to execute instructions that process information;
a memory coupled to the motherboard and interfaced with the processor, the memory operable to store the instructions and information;
a display coupled in the lid portion and interfaced with the processor, the display operable to present the information as visual images;
a housing cover portion having a keyboard slot and engaging the housing main portion to enclose the motherboard, the keyboard slot having a rib at a rear upper side; and
a keyboard having a tab extending from a top side, the tab having a detent on a bottom side, the keyboard sliding into the keyboard slot to align the rib and the tab, the tab flexing when sliding over the rib, the rib engaging the detent to hold the keyboard in position.

2. The information handling system of claim 1 further comprising:
a keystone sized to fit in a gap between the keyboard rear side and a rear side of the housing main portion to hold the keyboard in position.

3. The information handling system of claim 2 wherein the tab has an opening between the detent and the keyboard and the keystone further comprises a member extending down through the opening to hold the keyboard in position.

4. The information handling system of claim 1 further comprising:
plural contact pads exposed at a bottom side of the keyboard and interfaced with the keyboard to communicate key inputs, the plural contact pads aligned with an opening through the housing cover portion; and
plural contact pins coupled to the motherboard and aligned with the plural contact pads to receive the key inputs.

5. The information handling system of claim 4 further comprising:
a touchpad coupled in the housing cover portion and having a connector extending into the keyboard slot to communicate touchpad inputs; and
plural touchpad contacts exposed at a bottom side of the keyboard and aligned to interface with the touchpad connector to accept touchpad inputs, the touchpad contacts interfaced through a circuit board of the keyboard with the plural keyboard contact pads.

6. The information handling system of claim 5 further comprising:

a circuit board included in the keyboard and having the plural contacts and plural touchpad contacts; and a keyboard controller coupled to the circuit board and operable to detect key inputs from a keyboard scan.

7. The information system of claim 6 further comprising:

a USB hub coupled to the circuit board and interfaced with the keyboard controller, the plural contacts and the plural touchpad contacts;

wherein the USB hub sends key input and touchpad input information to the motherboard through a common serial link.

8. The information handling system of claim 1 further comprising:

a post extending up from the keyboard proximate an unpopulated key slot of the keyboard; and a fingerprint reader sized to fit in the unpopulated key slot and having a flexible member positioned to bias against the post to hold the fingerprint reader in position.

9. The information handling system of claim 8 further comprising:

a power button included in the fingerprint reader to accept a press that commands power on and power off; and a flexible cable coupled to the fingerprint reader and terminating with connector configured to interface with the motherboard.

10. A method for coupling a keyboard to a housing of a portable information handling system, the method comprising:

sliding the keyboard into a slot formed in the housing cover portion;

flexing a tab of the keyboard by interaction of a detent on a bottom side of the tab with a rib of the housing cover portion on an upper side of the housing cover portion; and engaging the detent of the tab with the rib of the housing cover portion to hold the keyboard in place at the housing cover portion.

11. The method of claim 10 further comprising:

forming and opening in the tab between the keyboard and the detent; and coupling a keystone over the tab, the keystone having a member inserted through the opening.

12. The method of claim 11 further comprising:

exposing plural contacts at a bottom surface of the keyboard, the contacts communicating key inputs; and interfacing the plural contacts with a motherboard below the keyboard, the interfacing through an opening in the housing cover portion.

13. The method of claim 11 further comprising:

coupling a touchpad in the housing cover portion; and interfacing the touchpad with touchpad contacts exposed at the bottom surface of the keyboard to communicate touchpad inputs to the keyboard.

14. The method of claim 13 further comprising:

interfacing a keyboard controller with a USB hub of the keyboard to communicate keyboard inputs to the plural contacts;

interfacing the touchpad contacts with the USB hub; and communicating the keyboard inputs and touchpad inputs from the USB hub through a common serial link.

15. The method of claim 14 further comprising:

coupling a post to extend up from the keyboard proximate an unpopulated key slot of the keyboard; and coupling a fingerprint reader in the unpopulated key slot by engaging a flexible member positioned to bias against the post to hold the fingerprint reader in position.

16. A system for coupling a keyboard to an information handling system housing main portion, the system comprising:

a housing cover portion having a keyboard slot and engaging the housing main portion to enclose processing components coupled to a motherboard, the keyboard slot having a rib exposed at a rear upper side side;

a keyboard having a tab extending from a top side, the tab having a detent on a bottom side, the keyboard sliding into the keyboard slot to align the rib and the tab, the tab flexing when sliding over the rib, the rib engaging the detent to hold the keyboard in position, the tab having an opening between the detent and the keyboard; and a keystone sized to fit in a gap between the keyboard rear side and a rear side of the housing main portion to hold the keyboard in position, the keystone having a member extending down through the opening to hold the keyboard in position.

17. The system of claim 16 further comprising: plural contact pads exposed at a bottom side of the keyboard and interfaced with the keyboard to communicate key inputs, the plural contact pads aligned with an opening through the housing cover portion; and plural contact pins coupled to the motherboard and aligned with the plural contact pads to receive the key inputs.

18. The system of claim 17 further comprising:

a touchpad coupled in the housing cover portion and having a connector extending into the keyboard slot to communicate touchpad inputs; and plural touchpad contacts exposed at a bottom side of the keyboard and aligned to interface with the touchpad connector to accept touchpad inputs, the touchpad contacts interfaced through a circuit board of the keyboard with the plural keyboard contact pads.

19. The system of claim 18 further comprising:

a circuit board included in the keyboard and having the plural contacts and plural touchpad contacts;

a keyboard controller coupled to the circuit board and operable to detect key inputs from a keyboard scan; and a USB hub coupled to the circuit board and interfaced with the keyboard controller, the plural contacts and the plural touchpad contacts;

wherein the USB hub sends key input and touchpad input information to the motherboard through a common serial link.

* * * * *